(12) United States Patent
Tanaka et al.

(10) Patent No.: US 9,700,172 B2
(45) Date of Patent: Jul. 11, 2017

(54) HEATING COOKER

(71) Applicant: Sharp Kabushiki Kaisha, Osaka-shi, Osaka (JP)

(72) Inventors: Motoki Tanaka, Osaka (JP); Mao Yamada, Osaka (JP); Noriko Kurihara, Osaka (JP); Yuko Nakajima, Osaka (JP); Setsuko Kobashi, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 266 days.

(21) Appl. No.: 14/385,908

(22) PCT Filed: Mar. 15, 2013

(86) PCT No.: PCT/JP2013/057531
§ 371 (c)(1),
(2) Date: Sep. 17, 2014

(87) PCT Pub. No.: WO2013/141176
PCT Pub. Date: Sep. 26, 2013

(65) Prior Publication Data
US 2015/0068409 A1   Mar. 12, 2015

(30) Foreign Application Priority Data

Mar. 19, 2012 (JP) ................................. 2012-062382
Mar. 30, 2012 (JP) ................................. 2012-079238

(51) Int. Cl.
*A47J 43/044* (2006.01)
*A47J 36/16* (2006.01)
(Continued)

(52) U.S. Cl.
CPC .......... *A47J 36/165* (2013.01); *A47J 27/004* (2013.01); *A47J 27/04* (2013.01); *A47J 43/044* (2013.01); *A47J 2043/04481* (2013.01)

(58) Field of Classification Search
CPC ........ A47J 36/165; A47J 27/004; A47J 27/04; A47J 43/0722; A47J 27/00; A47J 2043/04481; A47J 43/044
(Continued)

(56) References Cited

U.S. PATENT DOCUMENTS 7,619,188 B2 * 11/2009 Oghafua ............... A23L 1/0121
                                                        219/600
8,172,452 B2 *  5/2012 Bacon .................... B65D 51/32
                                                        366/130
(Continued)

FOREIGN PATENT DOCUMENTS

JP         6-38833 Y2   10/1994
JP       2001-46891 A    2/2001
(Continued)

OTHER PUBLICATIONS

Machine translation of JP2008-278924, Mishima et al, Nov. 20, 2008.*

*Primary Examiner* — Reginald L Alexander
(74) *Attorney, Agent, or Firm* — Birch, Stewart, Kolasch & Birch, LLP

(57) ABSTRACT

A heating cooker includes a container for containing an object to be heated, a stirrer for stirring the object inside the container, and a stirring controller for controlling a stirring operation of the stirrer. In cooking the object under stirring by the stirrer, the stirring controller determines a state of the object from at least one of a cooking menu to be executed and a heating time, and controls at least one of a stirring speed, a stirring-operation timing and a stirring direction of the stirrer in accordance with the state of the object. Thus, (Continued)

the heating cooker can perform proper stirring suited to a mixed state and/or viscosity of ingredients during the cooking process.

1 Claim, 18 Drawing Sheets

(51) Int. Cl.
*A47J 27/00* (2006.01)
*A47J 27/04* (2006.01)

(58) Field of Classification Search
USPC ........... 99/331, 348; 366/146, 201, 244–254, 366/347
See application file for complete search history.

(56) References Cited

U.S. PATENT DOCUMENTS

| 2005/0201198 A1* | 9/2005 | Farrell | A47J 43/0705 366/138 |
| 2007/0086271 A1* | 4/2007 | Hamilton | B01F 7/0005 366/325.2 |
| 2011/0174169 A1 | 7/2011 | Watanabe et al. | |

FOREIGN PATENT DOCUMENTS

| JP | 2008-18112 A | 1/2008 |
| JP | 2008-278924 A | 11/2008 |
| JP | 2009-26579 A | 2/2009 |
| JP | 2011-224165 A | 11/2011 |

* cited by examiner

HEATING COOKER

TECHNICAL FIELD

The present invention relates to a heating cooker and, more particularly, to a heating cooker having a stirring function.

BACKGROUND ART

As a first conventional heating cooker, there is a rice cooker in which a stirrer is rotatably provided on a lid that opens and closes an upper part of a rice cooker body, the stirrer being driven by a rotation driving unit to stir boiling objects or ingredients in an inner pot (see, e.g., JP 2008-278924 A (PTL1)).

The above rice cooker has the following problem. In cooking a mixture of water and cooking ingredients for Nikujaga (simmered meat and potatoes) or Chikuzen-ni (chicken and vegetables fried and boiled with soy), outer peripheral portions of the water surface in the inner pot rise during the stirring operation so that the cooking ingredients (onion, burdock etc.) tend to stick to a side surface (at positions higher than the water level) of the inner pot. Further, while a large amount of cooking ingredients contained in the inner pot is being stirred in one direction continuously, cooking ingredients stacked one on another tend to be pushed up against the inner side surface of the inner pot, thus being kept from being immersed in the broth. This causes heating nonuniformities and scorching.

As a second conventional heating cooker, there is a rice cooker having a stirring function for stirring rice and water in an inner pot (see, e.g., JP 2008-18112 A (PTL2)). With this rice cooker, water absorption time is shortened by stirring the rice and water in the container in a water absorption step during the rice cooking.

The above rice cooker has the following problem. In cooking foods using cooking ingredients which are increased in viscosity by being heated, such as jam, boiled beans, and Tsukudani of mushrooms (mushrooms boiled down in soy source) of mushrooms, air bubbles generated reach the lid, as a result of which the ingredients boil over. For this reason, this rice cooker is incapable of cooking foods, such as jam, that tend to boil over.

CITATION LIST

Patent Literature

PTL1: JP 2008-278924 A
PTL2: JP 2008-18112 A

SUMMARY OF THE INVENTION

Technical Problem

As described above, in either case of the first and second conventional heating cookers, it is impossible to perform proper stirring suited to a mixed state or viscosity of the ingredients during the cooking process.

Accordingly, an object of the present invention is to provide a heating cooker capable of implementing a proper stirring operation suited to a mixed state or viscosity or the like of ingredients during a cooking operation.

Solution to Problem

A heating cooker according to an aspect of the present invention includes:

a container for containing an object to be heated;
a stirring mechanism for stirring the object inside the container; and
a stirring controller for controlling a stirring operation of the stirring mechanism, wherein
in cooking the object under stirring by the stirring mechanism, the stirring controller determines a state of the object from at least one of a cooking menu to be executed and a heating time, and controls at least one of a stirring speed, a stirring-operation timing and a stirring direction of the stirring mechanism in accordance with the state of the object.

With the above arrangement, in cooking the object under stirring by the stirring mechanism, the stirring controller determines a state of the object from the cooking menu to be executed and/or the heating time, and controls the stirring speed, the stirring-operation timing and/or the stirring direction of the stirring mechanism in accordance with the state of the object. Therefore, it is possible to fulfill a proper stirring suited to the state, such as a state of viscosity, of food whose viscosity increases due to heating, such as jam, boiled beans, Tsukudani (soy-boiled food) of mushrooms.

In one embodiment, during cooking in which block-like pieces of one or more cooking ingredients selected from meats, fishes and vegetables as well as a liquid soup, which are the object to be heated, are rotated by the stirring mechanism, the stirring controller controls the stirring mechanism in such a fashion that a continuous rotation period in which the stirring mechanism is rotated continuously and a rotation stop period in which the rotation of the stirring mechanism is stopped to turn back inward of the container a cooking ingredient that has been displaced outward within the container by a centrifugal force, are alternately repeated.

The block like pieces of a cooking ingredient, which are also referred to as a block-like cooking ingredient hereinbelow, include pieces of proper sizes for ease of eating into which the cooking ingredient such as a kind of meat, a kind of fish, a kind of vegetable is cut and chips of burdock, onion, etc.

According to the above embodiment, during cooking operation in which a mixture of the block-like cooking ingredient(s) selected from among ingredients including meats, fishes and vegetables, and a liquid soup, which are the object to be heated, is rotated by the stirring mechanism, the stirring controller controls the stirring mechanism in such a fashion that the continuous rotation period in which the stirring mechanism is rotated continuously and the rotation stop period in which the rotation of the stirring mechanism is stopped to turn back inward of the container a cooking ingredient that has been displaced outward within the container by a centrifugal force, are alternately repeated. In this way, the stirring mechanism is intermittently rotated with its rotating time kept under a certain time period. As a result of this, indeed the block-like pieces of the cooking ingredients are moved by rotational force given by the stirring mechanism during the rotation of the stirring mechanism, but outer peripheral portions of the liquid surface in the container are kept from being excessively elevated by the centrifugal force due to the rotation of the stirring mechanism. Also, the outer peripheral portions of the water surface in the container are moved up and down by repetitions of the alternate continuous rotation periods and rotation stop periods of the stirring mechanism, by which the block-like pieces of the cooking ingredients that tend to adhere to the inner side surface of the container can be loosened therefrom. Thus, the mixture of block-like pieces of the cooking ingredients and the liquid soup can be stirred and mixed uniformly without adhesion of the cooking ingredients to the inner side surface of the container, so that heating nonuniformities and scorching of the inner side surface of the container can be suppressed.

In one embodiment, the stirring controller controls the stirring mechanism such that the rotation stop period becomes shorter and shorter as the block-like pieces of the one or more cooking ingredients are softened more and more during the cooking.

According to the embodiment, as the block-like pieces of the cooking ingredients are increasingly softened during a cooking operation, the rotation stop period is shortened more and more. Therefore, as the heating time elapses, the mixture of the block-like pieces of the cooking ingredient and the liquid soup is liquefied so as to be less stuck or adhered to the inner side surface of the container. Thus, the continuous rotation period of the stirring mechanism can be made longer relative to the rotation stop period, making it possible to achieve a more uniform mixing.

In one embodiment, the heating cooker further includes:
a heating cooker body for housing the container therein;
a heating part placed in the heating cooker body to heat the container; and
a lid openably and closably attached to an upper part of the heating cooker body, the lid being able to be closed to cover the container, wherein
the stirring mechanism includes a rotator attached on an container side of the lid, a stirrer attached to the rotator and being switchable between a stirring state of being in contact with the object to be heated within the container and a non-stirring state of being apart from the object to be heated within the container, and a driving part for rotating the rotator, and
the stirring controller controls the driving part in such a fashion that a first process in which the rotator is rotated at a first rotation speed with the stirrer being in the non-stirring state and a second process in which the rotator is rotated at a second rotation speed lower than the first rotation speed with the stirrer being in the stirring state, are alternately repeated.

According to the embodiment, the rotator is rotated by the driving part under control of the stirring controller at the first rotation speed with the stirrer being in the non-stirring state in the first process, and at the second rotation speed lower than the first rotation speed with the stirrer being in the stirring state in the second process. The stirring controller controls the driving part such that the first process and the second process are repeated alternately. With such a control, during cooking of food such as a jam, boiled beans, and Tsukudani (soy-boiled food) of mushrooms whose ingredients are increased in viscosity by heating, even if such air bubbles as reach the lid are generated from the ingredients of the food, it is possible to prevent the heating cooker from boiling over in the first process because the air bubbles are moved or scattered radially outwardly by the rotator and the stirrer (in the non-stirring state) rotating at the first rotation speed, so that the air bubbles are prevented from reaching the lid in the container. Further, in the second process, by heating the container with a low thermal power, generation of air bubbles reaching the lid is prevented. Therefore, stirring the ingredients by the stirrer in the stirring state allows the ingredients in the container to be uniformly mixed, resulting in an achievement of good-finish cooking of food having a high viscosity such as a jam, without boiling over.

In one embodiment, the heating cooker further includes a heating controller for controlling the heating part to heat the container with a first thermal power in the first process and with a second thermal power lower than the first thermal power in the second process.

In the embodiment, in the first process, the heating controller controls the heating part to heat the container with the first thermal power and the stirring controller controls the driving part to rotate the rotator at the first rotation speed with the stirrer being in the non-stirring state. In the second process, the heating controller controls the heating part to heat the container with the second thermal power lower than the first thermal power and the stirring controller controls the driving part to rotate the rotator at the second rotation speed lower than the first rotation speed with the stirrer being in the stirring state. By repeating the first and second processes alternately, during cooking of food such as a jam, boiled beans, and Tsukudani (soy-boiled food) of mushrooms whose ingredients are increased in viscosity by heating, even if such air bubbles as reach the lid are generated from the ingredients of the food, it is possible to prevent the heating cooker from boiling over in the first process because the air bubbles are moved or scattered radially outwardly by the rotator and the stirrer (in the non-stirring state) rotating at the first rotation speed, so that the air bubbles are prevented from reaching the lid in the container. Further, in the second process, while heating the container with the second thermal power lower than the first thermal power so as to prevent generation of air bubbles reaching the lid, the ingredients are stirred by the stirrer in the stirring state, which allows the ingredients in the container to be uniformly mixed, resulting in an achievement of good-finish cooking of food.

In one embodiment, the lid is provided with a steam discharge port for discharging steam from the container to outside, which port is placed on a container side of the lid and in a region inner than rotational loci of outermost peripheral portions of the rotator and the stirrer in the non-stirring state.

According to the embodiment, due to provision of the steam discharge port for discharging steam from the container to outside on the container side of the lid and in the region inner than the rotational loci of the outermost peripheral portions of the rotator and the stirrer in the non-stirring state, it becomes possible to move or scatter air bubbles radially outwardly by rotating the rotator and the stirrer (in the non-stirring state) at, for example, a high rotation speed (the first rotation speed), whereby the air bubbles can be prevented from reaching the steam discharge port of the lid. Thus, boiling over through the steam discharge port can securely be prevented.

In one embodiment, the object to be heated includes an ingredient whose viscosity is increased by heating of the container by the heating part so that air bubbles generated from the ingredient tends to reach the lid due to the increased viscosity.

According to the embodiment, it is possible to cook food using an ingredient whose viscosity is increased by heating of the container by the heating part so that air bubbles generated from the ingredient tends to reach the lid due to the increased viscosity, such as a jam, boiled beans, Tsukudani of mushrooms (mushrooms boiled down in soy source), and so on.

In one embodiment, the heating controller controls the heating part to heat the container before the first process with a third thermal power lower than the first thermal power and higher than the second thermal power such that the container containing the object to be heated becomes a predetermined temperature before the first process.

According to the embodiment, under control of the heating controller, before the first process, the heating part heats the container with the third thermal power (which is lower than the first thermal power and higher than the second thermal power), so that the container containing the object to be heated becomes a predetermined temperature before the first process. As a result of this, moisture contents come out from solid ingredients before the first process, by which it becomes possible to prevent scorching due to the heating with the first thermal power in the first process.

In one embodiment, during the continuous rotation period, the stirring controller makes the rotating stirring mechanism inverted in its rotational direction between forward and reverse directions.

According to the embodiment, the rotating stirring mechanism inverts its rotational direction in the first process under control of the stirring controller. Thus, the mixture of the block-like pieces of the cooking ingredient(s) and the liquid soup can be given reactionary force, resulting in achievement of more uniform mixing.

In one embodiment, the stirring controller makes a stirring speed of the stirring mechanism slower and slower as the cooking progresses.

According to the embodiment, the stirring speed of the stirring mechanism is made slower under control of the stirring controller as the cooking progresses. Therefore, the mixture of block-like cooking ingredients and liquid soup is liquefied and moreover the ingredients are softened along with the elapse of the heating time, so that the ingredients can be mixed uniformly without being damaged by the stirring.

Advantageous Effects of Invention

As is apparent from the above, the present invention can achieve a heating cooker that performs proper stirring suited to a mixed state and/or viscosity of the ingredients during the cooking process.

DESCRIPTION OF THE EMBODIMENTS

Hereinbelow, a heating cooker according to the present invention will be described in detail by way of embodiments thereof illustrated in the accompanying drawings.

First Embodiment

Figure 1:
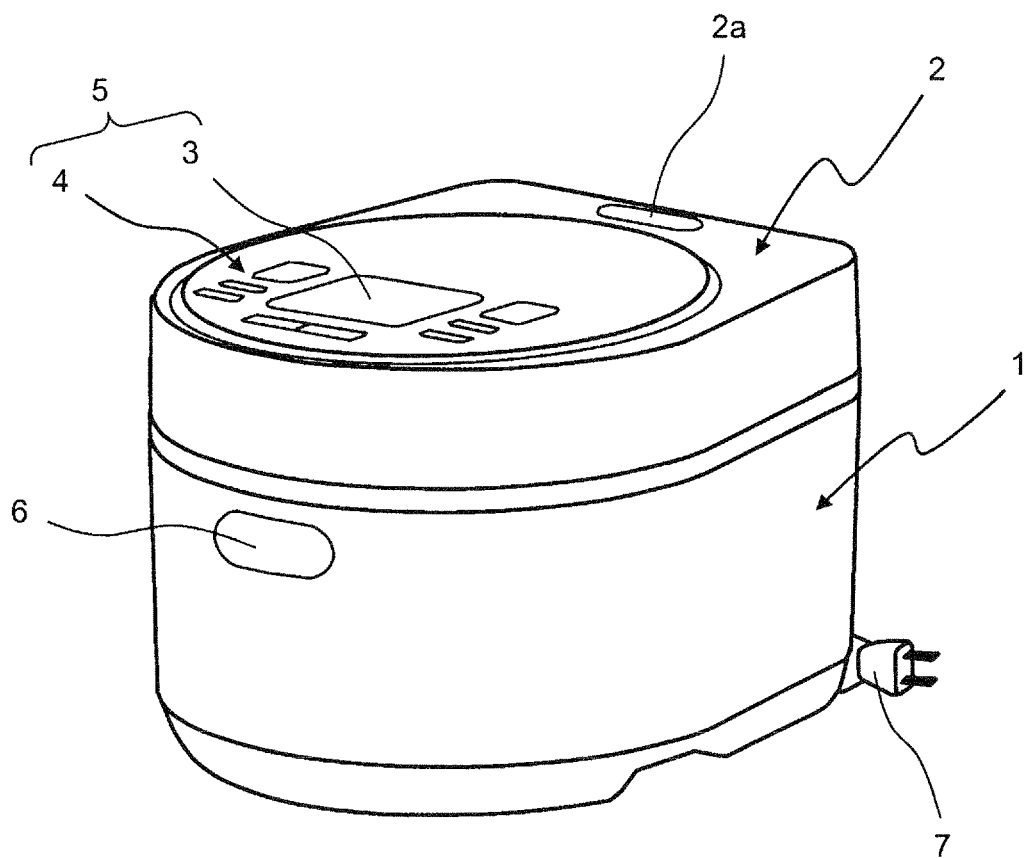
FIG. 1 shows a perspective view of a multi-menu rice cooker as an example of a heating cooker according to a first embodiment of the invention.

FIG. 1 is a perspective view of a multi-menu rice cooker as an example of a heating cooker according to a first embodiment of the invention.

The multi-menu rice cooker of the first embodiment, as shown in FIG. 1, includes a rice cooker body 1, and a lid 2 openably and closably attached to an upper part of the rice cooker body 1. The rice cooker body 1 has a display operation part 5 provided on the front side, a hook button 6 provided on the upper front side, and a power cord 7 connected to the lower rear side. Also, a steam outlet 2a is provided on the rear side of the lid 2. The display operation part 5 is composed of an LCD (Liquid Crystal Display) part 3 and a plurality of operation buttons 4. Displaying of cooking menus, cooking statuses and the like and handling button operations can be fulfilled with this display operation part 5.

Figure 2:
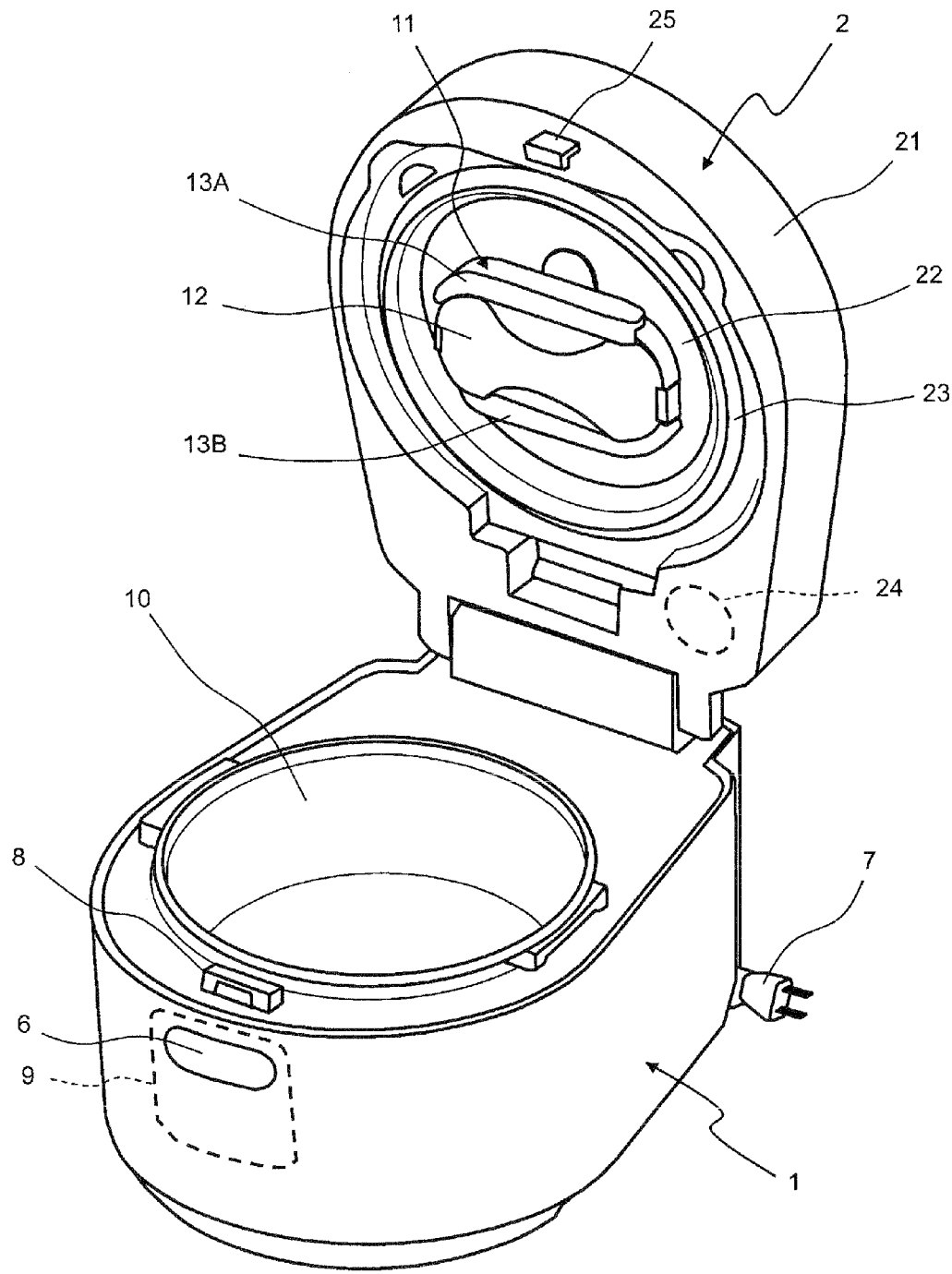
FIG. 2 shows a perspective view of the multi-menu rice cooker with its lid opened.

FIG. 2 is a perspective view of the multi-menu rice cooker with its lid 2 opened.

The multi-menu rice cooker, as shown in FIG. 2, also includes an inner pot 10 as an example of the container housed in the rice cooker body 1. The lid 2 is to be closed so as to cover the inner pot 10.

The inner pot 10 is formed of a high thermal conductivity material such as aluminum for example. A magnetic material such as stainless for improving the heating efficiency is attached to an outer surface of the inner pot 10, while its inner surface is coated with fluororesin for preventing heated ingredients from adhering thereto.

The lid 2 includes an outer lid 21 pivotably held by the rice cooker body 1, and an inner lid 22 removably attached to one side of the outer lid 21 closer to the inner pot 10. An annular-shaped packing 23 made of a heat-resistant rubber is removably attached to the outer periphery of the inner lid 22. With the lid 2 closed, the packing 23 comes into tight contact with the inner pot 10 so as to make a seal between the inner pot 10 and the inner lid 22. Also, the inner lid 22 is provided with a steam discharge port (not shown).

An engaged portion 8 is provided at a front portion in the top of the rice cooker body 1. This engaged portion 8 is to be releasably engaged with an engaging portion 25 provided at a front portion in the bottom of the lid 2. Also, a lock mechanism 9 for locking the lid 2 is provided in the rice cooker body 1. While the lock mechanism 9 is not locking the lid 2, pressing the hook button 6 causes the engaged portion 8 to be moved rearward so that the engaged portion 8 is disengaged from the engaging portion 25. Conversely, while the lock mechanism 9 is locking the lid 2, pressing the hook button 6 does not cause the engaged portion 8 to be moved rearward, so that the engaged portion 8 is not disengaged from the engaging portion 25.

A drive motor 24 is placed at a right-side rear portion in the outer lid 21, and a coupling part 20 (shown in FIG. 6) is placed at a central portion of the outer lid 21. This coupling part 20 is rotated upon reception of rotation driving force generated by the drive motor 24 via a pulley (not shown) and a belt (not shown).

Further, a stirring unit 11 made from heat-resistant resin is rotatably attached on one side of the inner lid 22 closer to the inner pot 10. The stirring unit 11 has a rotator 12 formed into a flattened-gourd shape, and first and second stirrer arms 13A, 13B placed on opposite sides of the rotator 12. These first and second stirrer arms 13A, 13B each have one end vertically rotatably attached to either end of the rotator 12. Further, a drive mechanism (shown in FIG. 3) for rotating the first and second stirrer arms 13A, 13B is provided in the rotator 12 of the stirring unit 11.

The stirring unit 11, the coupling part 20 and the drive motor 24 constitute the stirring mechanism.

Figure 3:
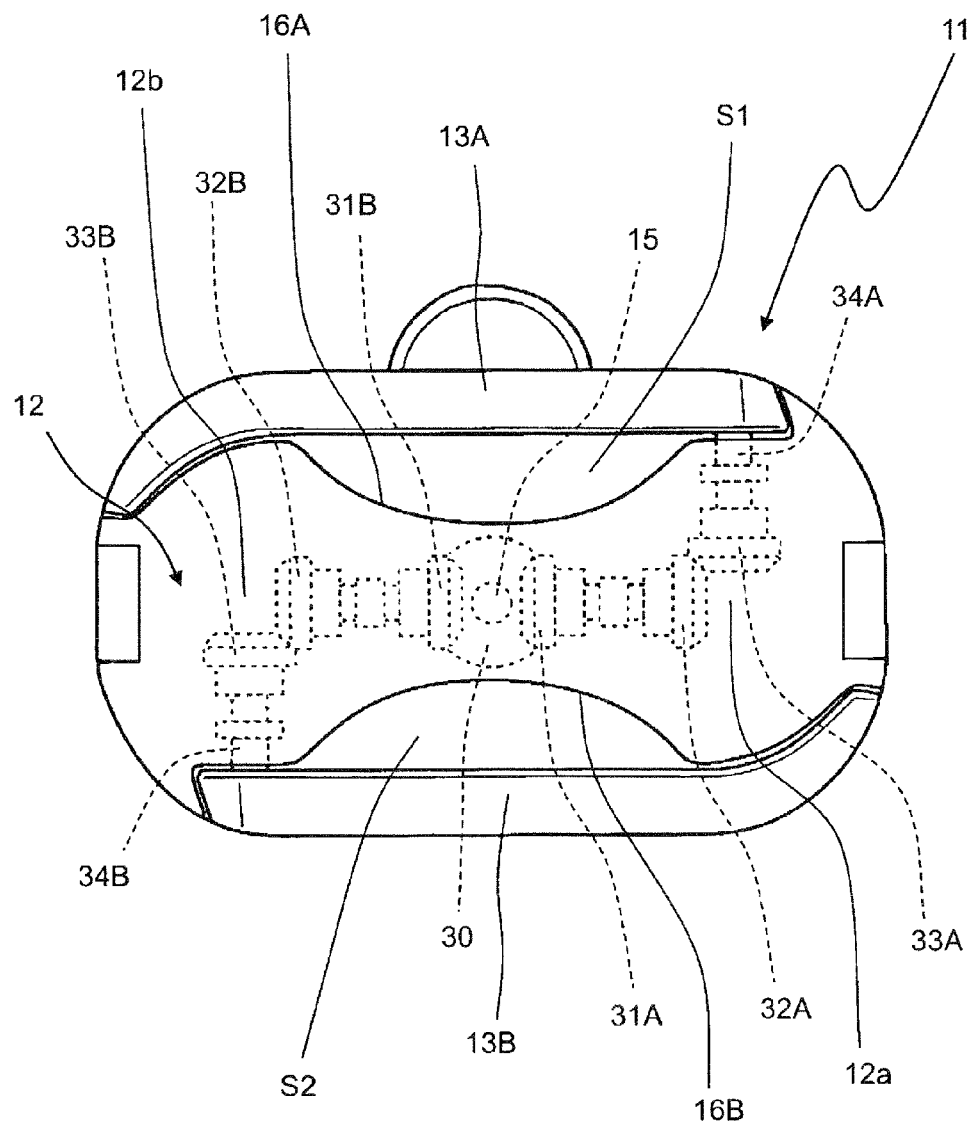
FIG. 3 shows a schematic view of a stirring unit as viewed from an inner pot side.

FIG. 3 is a schematic view of the stirring unit 11 as viewed from the inner pot 10 side.

As shown in FIG. 3, placed in the rotator 12 are a bevel gear 30 for both of the first and second stirrer arms, gears 31A, 32A, 33A for the first stirrer arm, and gears 31B, 32B, 33B for the second stirrer arm. Rotational drive force of a shaft part 15 placed at a generally center of the rotator 12 is transmitted to a pivot shaft 34A for the first stirrer arm via the bevel gear 30 for both of the first and second stirrer arms and the gears 31A, 32A, 33A for the first stirrer arm, and moreover transmitted to a pivot shaft 34B for the second stirrer arm via the bevel gear 30 for both of the first and second stirrer arms and the gears 31B, 32B, 33B for the second stirrer arm.

Figure 4:
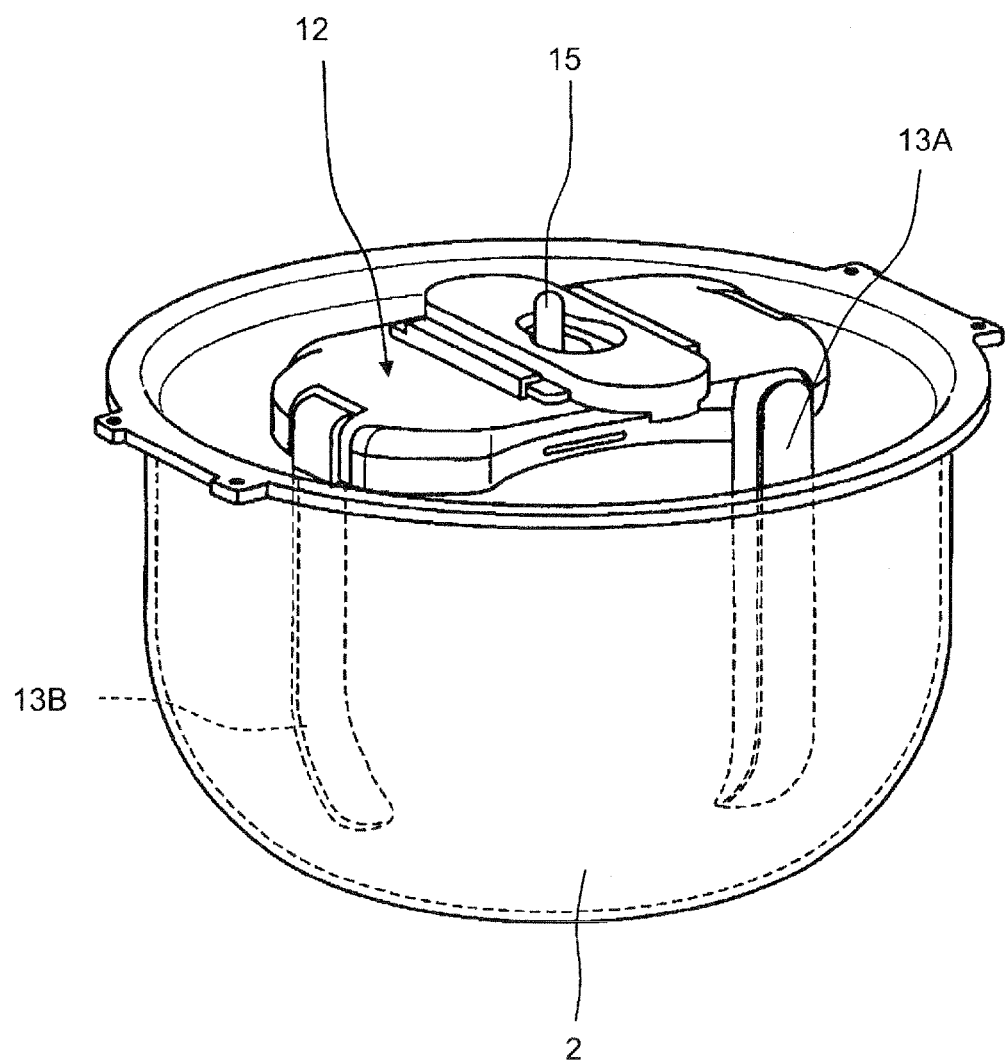
FIG. 4 shows a perspective view of the stirring unit and the inner pot of the multi-menu rice cooker.

As the shaft part 15 is rotated by the drive motor 24 (shown in FIG. 2) attached on the upper side of the inner lid 22, the first and second stirrer arms 13A, 13B are pivoted about the pivot shafts 34A, 34B for the first and second stirrer arms, respectively, thus making it possible to switch the state of the first and second stirrer arms 13A, 13B from a folded state, which is a non-stirring state shown in FIGS. 2 and 3, to an unfolded state, which is a stirring state shown in FIG. 4, and vice versa.

As shown in FIG. 3, the rotator 12 of the flattened-gourd shape has a first curved surface 16A of a circular-arc shape in plan view on the first stirrer arm 13A side, and a second curved surface 16B of a circular-arc shape in plan view on the second stirrer arm 13B side. As a result of this, the first and second stirrer arms 13A, 13B, while in the non-stirring state, are radially adjacent to the rotator 12, with spaces S1, S2 provided between the rotator 12 and the first and second stirrer arms 13A, 13B.

One end of the first stirrer arm 13A is attached to one larger-width portion of the rotator 12 via the pivot shaft 34A for the first stirrer arm. Also, one end of the second stirrer arm 13B is attached to the other larger-width portion 12b of the rotator 12 via the pivot shaft 34B for the second stirrer arm.

The bevel gear 30 for both of the first and second stirrer arms, the gears 31A, 32A, 33A for the first stirrer arm, the gears 31B, 32B, 33B for the second stirrer arm, and the pivot shafts 34A, 34B for the first and second stirrer arms constitute the drive mechanism.

By the drive mechanism that has received rotation driving force from the drive motor 24, the first and second stirrer arms 13A, 13B are pivoted so as to transit from the folded state shown in FIG. 2 to the unfolded state shown in FIG. 4 or from the unfolded state shown in FIG. 4 to the folded state shown in FIG. 2.

According to the multi-menu rice cooker constituted as described above, in the folded state of FIG. 2, the stirring unit 11 is rotated forward (rotated clockwise as viewed from above) by the drive motor 24 so that the first and second stirrer arms 13A, 13B are pivoted by the drive mechanism of the rotator 12 so as to be placed in the unfolded state as shown in FIG. 4. Then, with one-way rotation by the drive motor 24, the first and second stirrer arms 13A, 13B in the unfolded state are rotated integrally with the rotator 12. As a result, rice and water, for example, in the inner pot 10 are stirred by the rotating first and second stirrer arms 13A, 13B in the unfolded state.

On the other hand, when the first and second stirrer arms 13A, 13B are in the unfolded state of FIG. 4, reverse rotation (counterclockwise rotation as viewed from above) of the stirring unit by the drive motor 24 causes the first and second stirrer arms 13A, 13B to be pivoted by the drive mechanism of the rotator 12 so as to be placed in the folded state shown in FIG. 2. As a result, the first and second stirrer arms 13A, 13B are kept from obstructing opening/closing of the lid 2.

In this way, pivoting (unfolding, folding) of the first and second stirrer arms 13A, 13B as well as rotating of the stirring unit 11 can be fulfilled by the drive motor 24.

Figure 5:
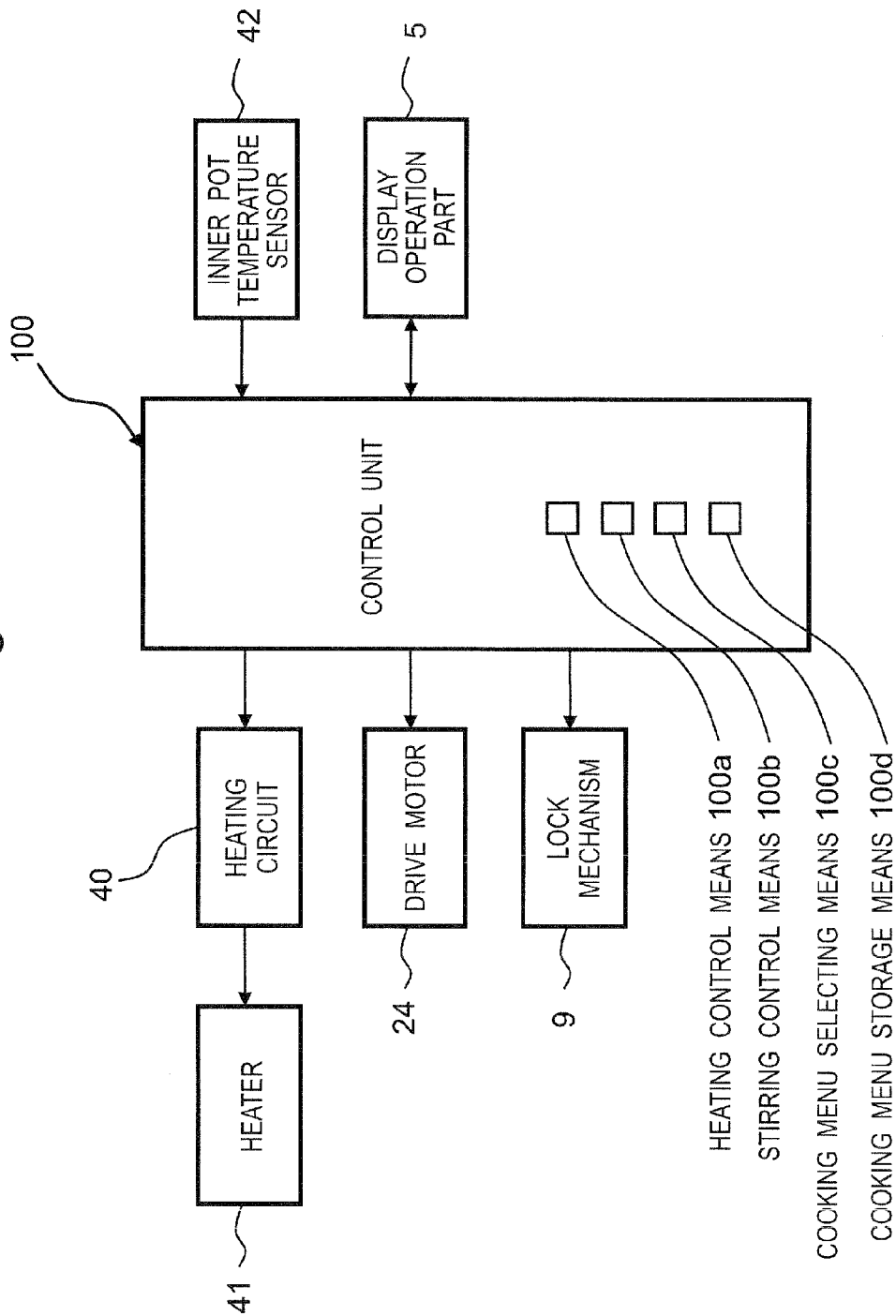
FIG. 5 shows a control block diagram of the multi-menu rice cooker.

FIG. 5 is a control block diagram of the multi-menu rice cooker. As shown in FIG. 5, the multi-menu rice cooker includes a control unit 100 composed of a microcomputer, input/output circuits and the like. The control unit 100 receives an input signal from an inner pot temperature sensor 42. The control unit 100 is also connected with the display operation part 5, the lock mechanism 9, the drive motor 24, and a heating circuit 40 for driving a heater 41 as an example of the heating part.

The control unit 100 has a heating control means 100a as an example of a heating controller for controlling the heater 41 based on a temperature of the inner pot 10 detected by the inner pot temperature sensor 42, a stirring control means 100b as an example of a stirring controller for controlling rotational operations of the driving part (stirring unit 11, coupling part 20, drive motor 24), a cooking menu selecting means 100c for selecting a desired cooking menu from among a plurality of cooking menus, and a cooking menu storage means 100d for storing heating conditions and stirring conditions for a plurality of cooking menus.

Figure 6:
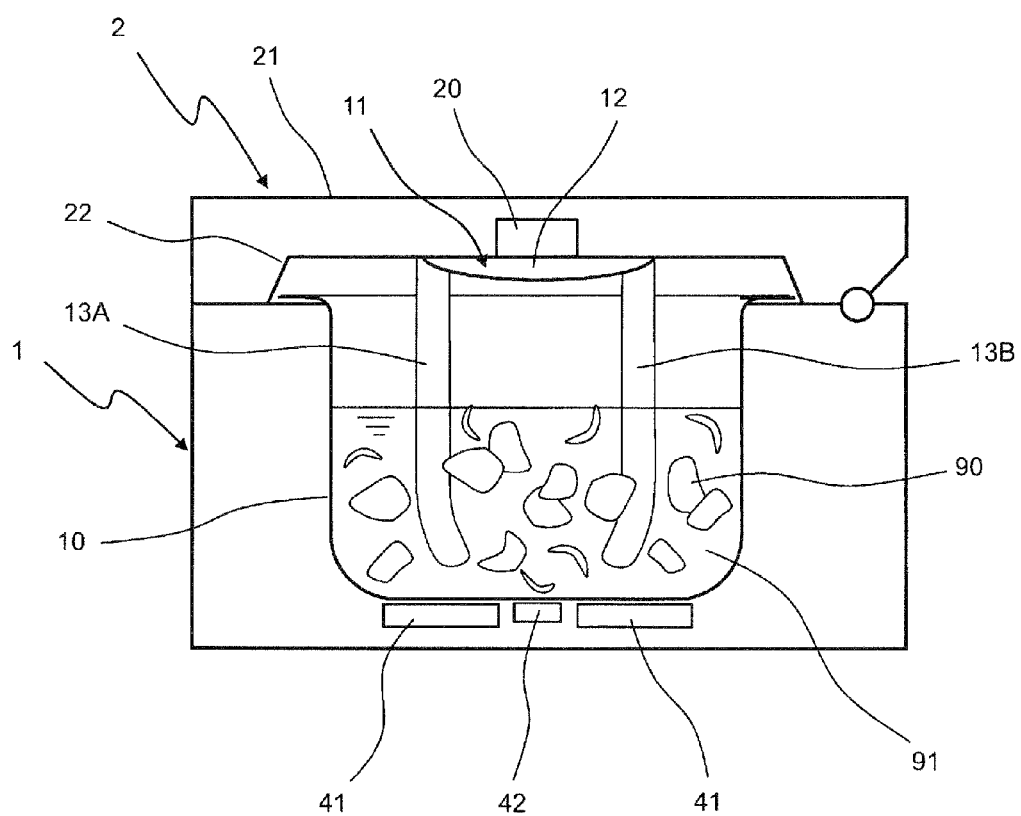
FIG. 6 shows a schematic sectional view of the multi-menu rice cooker in a state that the stirring unit is stopped.
Figure 7:
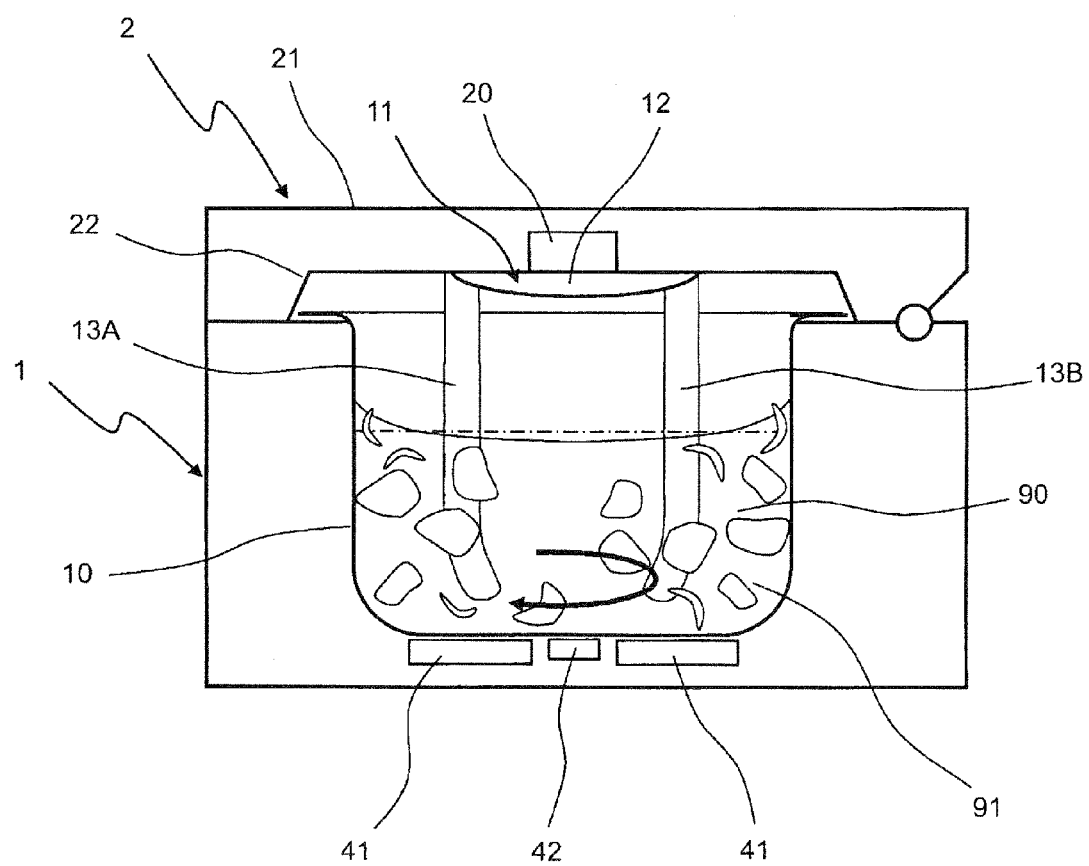
FIG. 7 shows a schematic sectional view of the multi-menu rice cooker in a state that the stirring unit is rotating.

FIG. 6 is a schematic sectional view of the multi-menu rice cooker in a state that the stirring unit is stopped. FIG. 7 is a schematic sectional view of the multi-menu rice cooker in a state that the stirring unit is rotating. In FIGS. 6 and 7, the same constituent members of the multi-menu rice cooker as those shown in FIGS. 1 and 2 are designated by the same reference signs.

As shown in FIGS. 6 and 7, for a cooking menu which involves heating of a mixture of block-like pieces of cooking ingredients and a liquid soup, such as Nikujaga (simmered meat and potatoes) or Chikuzen-ni (chicken and vegetables fried and boiled with soy), a mixture of cooking ingredients 90 and a liquid 91, which mixture is an object to be heated, is placed in the inner pot 10.

With the multi-menu rice cooker constituted as described above, the user operates the display operation part 5 to select a desired cooking menu from among a plurality of cooking menus stored in the cooking menu storage means 100d by the cooking menu selecting means 100c. The user selects, for example, selects a cooking menu which involves heating of a mixture of block-like cooking ingredients and a liquid soup (water and seasoning) such as Nikujaga (simmered meat and potatoes) or Chikuzen-ni from among the plurality of cooking menus.

Then, a heating condition and a stirring condition for the selected cooking menu are read from the cooking menu storage means 100d. As the user presses the start button of the display operation part 5, the cooking operation starts.

The drive motor 24 is now controlled by the stirring control means 100b of the control unit 100 so that the stirring unit 11 in the folded state is rotated forward (rotated clockwise as viewed from above) by the drive motor 24. As a result, the first and second stirrer arms 13A, 13B are pivoted by the drive mechanism of the rotator 12 so as to be placed in the unfolded state as shown in FIG. 4.

Next, the heater 41 is controlled by the heating control means 100a of the control unit 100 to start the heating of the mixture under the heating condition (heating sequence) for the cooking menu read from the cooking menu storage means 100d.

Then, after the start of the heating, when the mixture of block-like pieces of the cooking ingredients and the liquid soup as the object to be heated placed in the inner pot 10 is heated by the heater 41 controlled by the heating control means 100a, forward rotations (e.g., at 120 rpm for 5 sec.) of the stirring unit 11 and stops (e.g., for 1 sec.) are alternately repeated on the basis of the stirring conditions (e.g., number of rotations per unit time (stirring speed), rotating time, stop time, etc.) for the cooking menu read from the cooking menu storage means 100d by the drive motor 24 under control of the stirring control means 100b of the control unit 100.

In this way, the stirring unit 11 is intermittently rotated while its rotation time is kept under a certain time period. Thus, indeed the cooking ingredients are moved by rotational force given by the stirring unit 11 during the rotation of the stirring unit 11, but outer peripheral portions of the liquid surface in the inner pot 10 are prevented from being excessively elevated by centrifugal force due to the rotation of the stirring unit 11. Also, the outer peripheral portions of the water surface in the inner pot 10 are moved up and down by repetitions of a continuous rotation period and a rotation stop period of the stirring unit 11, by which cooking ingredients that tend to be stuck to the inner side surface of the inner pot 10 are loosened therefrom.

Figure 8:
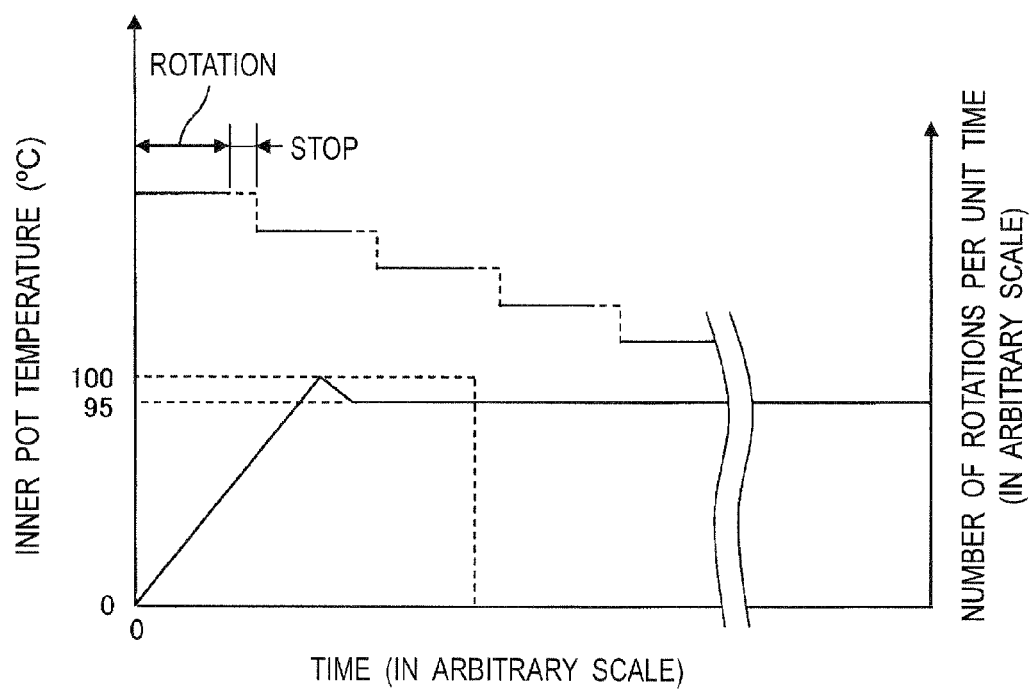
FIG. 8 shows an example of a timing chart for the multi-menu rice cooker.

FIG. 8 shows an example of a timing chart for the cooking menu which involves heating of a mixture of block-like pieces of cooking ingredients and a liquid soup, such as Nikujaga (simmered meat and potatoes) or Chikuzen-ni (chicken and vegetables fried and boiled with soy). In FIG. 8, the horizontal axis represents time (in arbitrary scale) and the vertical axis represents inner pot temperature (° C.) and number of rotations per unit time (in arbitrary scale).

As shown in FIG. 8, as the inner pot temperature has increased from the start of a heating operation and reached 100° C., input electric power to the heater 41 is decreased so that the inner pot temperature is held at 95° C. until an end of the heating operation. During this heating operation, forward rotations (e.g., for 5 sec.) and stops (e.g., for 1 sec.) of the stirring unit 11 are alternately repeated, where the number of rotations per unit time is lowered by a specified number of rotations for each forward rotation (e.g., lowered from 120 rpm to 80 rpm).

According to the multi-menu rice cooker constituted as described above, during the cooking operation in which the object to be heated is being stirred by the stirring part (stirring unit 11, coupling part 20, drive motor 24), a proper stirring suited to a mixed state of block-like pieces of cooking ingredients and a liquid soup can be fulfilled by judging a state of the object to be heated from at least one of the executed cooking menu and the heating time, and by controlling at least one of stirring speed, stirring-operation timing and stirring direction of the stirring mechanism by the stirring control means 100b in response to the determined state of the object to be heated.

Also, according to the above-described multi-menu rice cooker, during cooking operation in which the block-like pieces of one or more kinds of cooking ingredients selected from among ingredients including meats, fishes, vegetables and a liquid soup, which are the object to be heated, are rotated by the stirring mechanism (stirring unit 11, coupling part 20, drive motor 24), the stirring mechanism is controlled by the stirring control means 100b in such a fashion that a continuous rotation period for continuously rotating the stirring unit 11 and a rotation stop period for stopping the rotation of the stirring unit 11 are alternately repeated. The stopping of the rotation is intended to return the cooking ingredients, which have been displaced to the outer side within the inner pot 10 by centrifugal force, to the inner side of the inner pot 10. That is, the stirring unit 11 is intermittently rotated with its rotating time kept under a certain time period. As a result of this, indeed the block-like pieces of cooking ingredients are moved by rotational force given by the stirring unit 11 during the rotation of the stirring unit 11, but outer peripheral portions of the liquid surface in the inner pot 10 are kept from being excessively elevated by the centrifugal force due to the rotation of the stirring unit 11. Also, the outer peripheral portions of the water surface in the inner pot 10 are moved up and down by repetitions of the alternate continuous rotation periods and rotation stop periods of the stirring unit 11, by which the block-like pieces of cooking ingredients that tend to adhere to the inner side surface of the inner pot 10 can be loosened therefrom.

Thus, the mixture of block-like pieces of the cooking ingredients and the liquid soup can be stirred and mixed uniformly without adhering of the cooking ingredients to the inner side surface of the inner pot 10, so that heating nonuniformities and scorching of the inner side surface of the inner pot 10 can be suppressed.

Also, as the block-like pieces of the cooking ingredients are increasingly softened during a cooking operation, the rotation stop period is shortened more and more. Therefore, as the heating time elapses, the mixture of block-like pieces of the cooking ingredients and the liquid soup is liquefied so as to be less stuck to the inner side surface of the inner pot 10. Thus, the continuous rotation period of the stirring unit 11 can be made longer relative to the rotation stop period, making it possible to achieve a more uniform mixing of the cooking ingredients.

In this multi-menu rice cooker, the drive motor 24 is controlled by the stirring control means 100b in such a fashion that the continuous rotation period and the rotation stop period of the stirring unit 11 are alternately repeated so that ingredients in the mixture contained in the inner pot 10 are prevented from being stuck to the inner wall of the inner pot 10 by the rotation of the stirring unit 11. In this embodiment, based on results of experiments performed according to types and volumes of the mixture of cooking ingredients and liquid soup for individual cooking menus or other data, a number of rotations per unit time, a continuous rotation period, and a rotation stop period of the stirring unit 11 that enable cooking ingredients to be kept from being stuck to the inner wall of the inner pot 10 are determined (stirring speed control and stirring-operation timing control). As a result of this, cooking ingredients can securely be prevented from being stuck to the inner side surface of the inner pot 10.

Also, the stirring control means 100*b* corrects the ratio of the rotation stop period to the continuous rotation period of the stirring unit 11 according to a cooking menu selected by the cooking menu selecting means 100*c*. As a result of this, it is possible to use a continuous rotation period and a rotation stop period of the stirring unit 11 suited to the type of cooking ingredients and liquid soup depending on the cooking menu.

In this first embodiment, as means for correcting the ratio of rotation stop period to continuous rotation period of the stirring unit 11 according to a selected cooking menu, continuous rotation periods and rotation stop periods of the stirring unit 11 with their ratios previously set for individual cooking menus are registered in the cooking menu storage means 100*d*. When a desired cooking menu is selected from among a plurality of cooking menus registered in the cooking menu storage means 100*d*, stirring is performed with a continuous rotation period and a rotation stop period of the stirring unit 11 corresponding to the selected cooking menu.

In this first embodiment, by placing the drive motor 24 under control of the stirring control means 100*b*, when the continuous rotation period and the rotation stop period of the stirring unit 11 are alternately repeated, the stirring unit 11 is rotated in one identical direction. Instead, the stirring unit 11 may be rotated reverse at least one time (stirring-direction control). In such a case, the mixture of block-like cooking ingredients and liquid soup can be given reactionary force to be thereby mixed more uniformly.

Also in the first embodiment, a continuous rotation period and a rotation stop period of the stirring unit 11 are alternately repeated under the same conditions. However, the longer the heating time by the heater 41 becomes, the shorter the rotation stop period of the stirring unit 11 in the alternate repetitions of the continuous rotation period and the rotation stop period of the stirring unit 11 may be made by the stirring control means 100*b*. As a result of this, the mixture of block-like cooking ingredients and liquid soup is liquefied along with the elapse of the heating time, so that the ingredients are less stuck to the inner side surface of the inner pot 10. Thus, the continuous rotation period of the stirring unit 11 can be made longer so that the ingredients can be mixed more uniformly.

Alternatively, the number of rotations per unit time of the stirring unit 11 in the alternate repetitions of the continuous rotation period and the rotation stop period of the stirring unit 11 may be made smaller and smaller by the stirring control means 100*b* as the cooking progresses during a cooking operation. As a result of this, the mixture of block-like cooking ingredients and liquid soup is liquefied and moreover the ingredients are softened along with the elapse of the heating time, so that the ingredients can be mixed uniformly without being damaged by the stirring.

Second Embodiment

Figure 9:
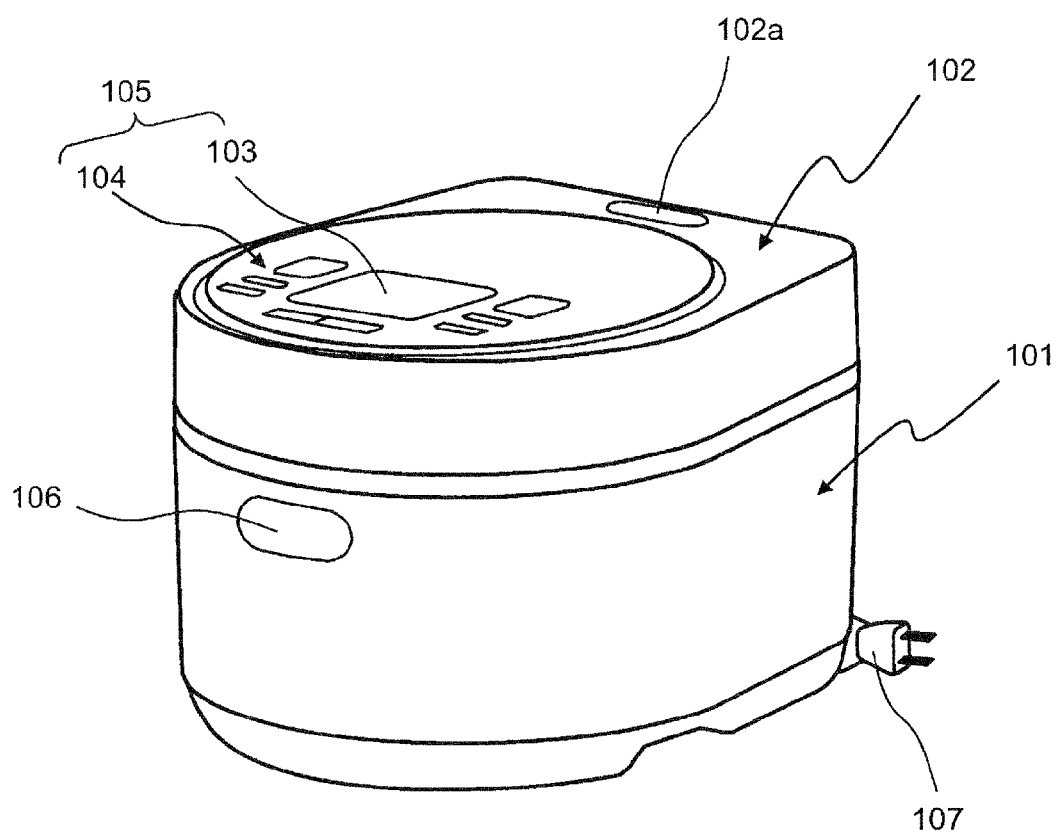
FIG. 9 shows a perspective view of a multi-menu rice cooker as an example of a heating cooker according to a second embodiment of the invention.

FIG. 9 is a perspective view of a rice cooker as an example of a heating cooker according to a second embodiment of the invention.

The rice cooker of the second embodiment, as shown in FIG. 9, includes a rice cooker body 101, and a lid 102 openably and closably attached to an upper part of the rice cooker body 101. The rice cooker body 101 has a display operation part 105 provided on the front side, a hook button 106 provided on the upper front side, and a power cord 107 connected to the lower rear side. Also, a steam outlet 102*a* is provided on the rear side of the lid 102. The display operation part 105 is composed of an LCD (Liquid Crystal Display) part 103 and a plurality of operation buttons 104. Displaying of cooking menus, cooking statuses and the like and handling of button operations can be fulfilled with this display operation part 105.

Figure 10:
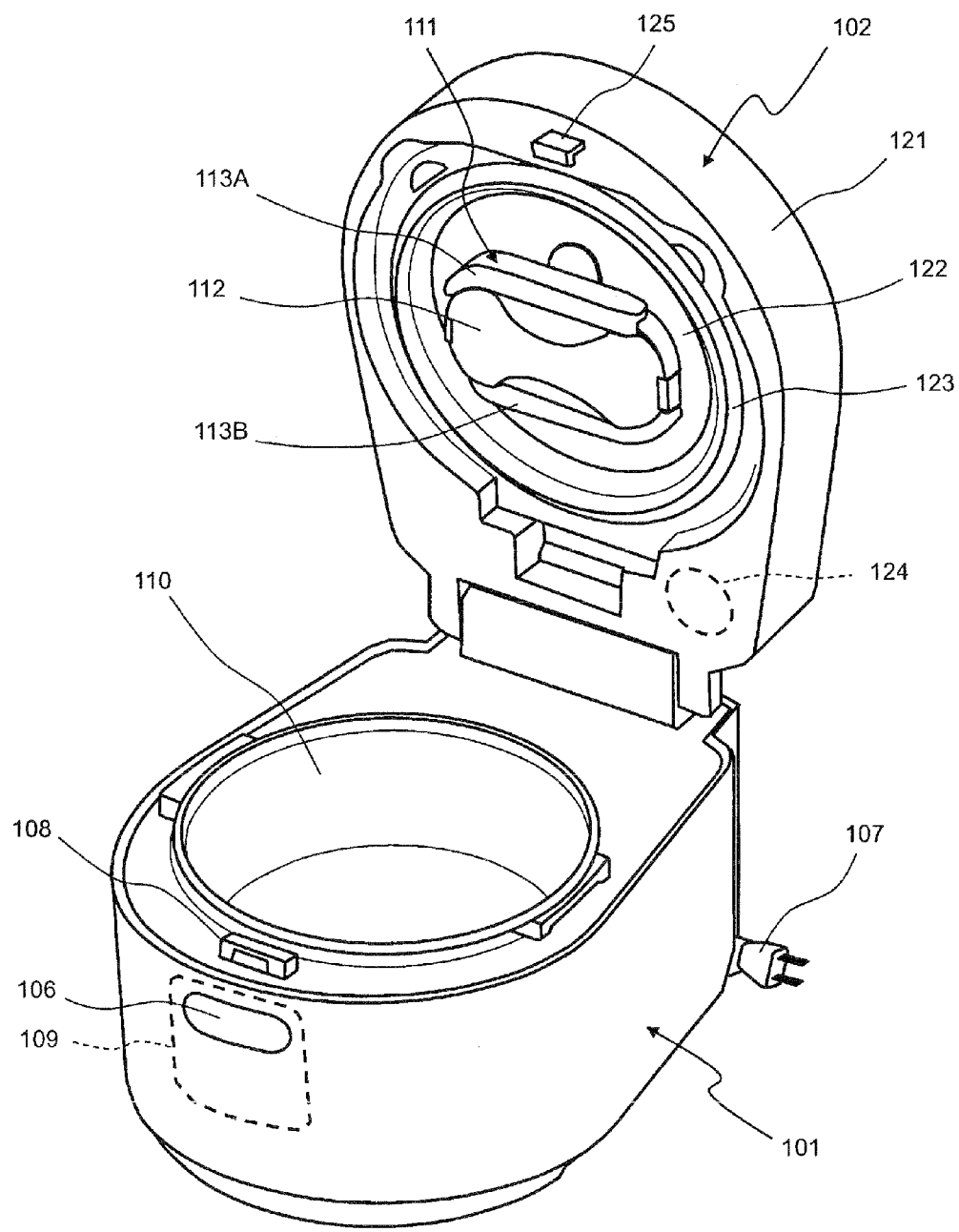
FIG. 10 shows a perspective view of the multi-menu rice cooker with its lid opened.

FIG. 10 is a perspective view of the rice cooker with its lid 102 opened.

The rice cooker, as shown in FIG. 10, also includes an inner pot 110 as an example of the container housed in the rice cooker body 101. The lid 102 is to be closed so as to cover the inner pot 110.

The inner pot 110 is formed of a high thermal conductivity material such as aluminum for example. A magnetic material such as stainless for improving the heating efficiency is attached to an outer surface of the inner pot 110, while its inner surface is coated with fluororesin for preventing heated ingredients from adhering thereto.

The lid 102 includes an outer lid 121 pivotably held by the rice cooker body 101, and an inner lid 122 removably attached to one side of the outer lid 121 closer to the inner pot 110. An annular-shaped packing 123 made of a heat-resistant rubber is removably attached to the outer periphery of the inner lid 122. With the lid 102 closed, the packing 123 comes into tight contact with the inner pot 110 so as to make a seal between the inner pot 110 and the inner lid 122. Also, the inner lid 122 is provided with a steam discharge port 122*a* (shown in FIG. 13).

An engaged portion 108 is provided at a front portion in the top of the rice cooker body 101. This engaged portion 108 is to be releasably engaged with an engaging portion 125 provided at a front portion in the bottom of the lid 102. Also, a lock mechanism 109 for locking the lid 102 is provided in the rice cooker body 101. While the lock mechanism 109 is not locking the lid 102, pressing the hook button 106 causes the engaged portion 108 to be moved rearward so that the engaged portion 108 is disengaged from the engaging portion 125. Conversely, while the lock mechanism 109 is locking the lid 102, pressing the hook button 106 does not cause the engaged portion 108 to be moved rearward, so that the engaged portion 108 is not disengaged from the engaging portion 125.

A drive motor 124 is placed at a right-side rear portion in the outer lid 121, and a coupling shaft (not shown) is placed at a central portion of the outer lid 121. This coupling shaft is rotated upon reception of rotation driving force generated by the drive motor 124 via a pulley (not shown) and a belt (not shown).

Further, a stirring unit 111 made from heat-resistant resin is rotatably attached on one side of the inner lid 122 closer to the inner pot 110. The stirring unit 111 has a rotator 112 formed into a flattened-gourd shape, and first and second stirrer arms 113A, 113B placed on opposite sides of the rotator 112. These first and second stirrer arms 113A, 113E each have one end vertically rotatably attached to either end of the rotator 112. Further, a drive mechanism (shown in FIG. 11) for rotating the first and second stirrer arms 113A, 113B is provided in the rotator 112 of the stirring unit 111.

The stirring unit 111, the coupling shaft and the drive motor 124 constitute a stirring mechanism.

Figure 11:
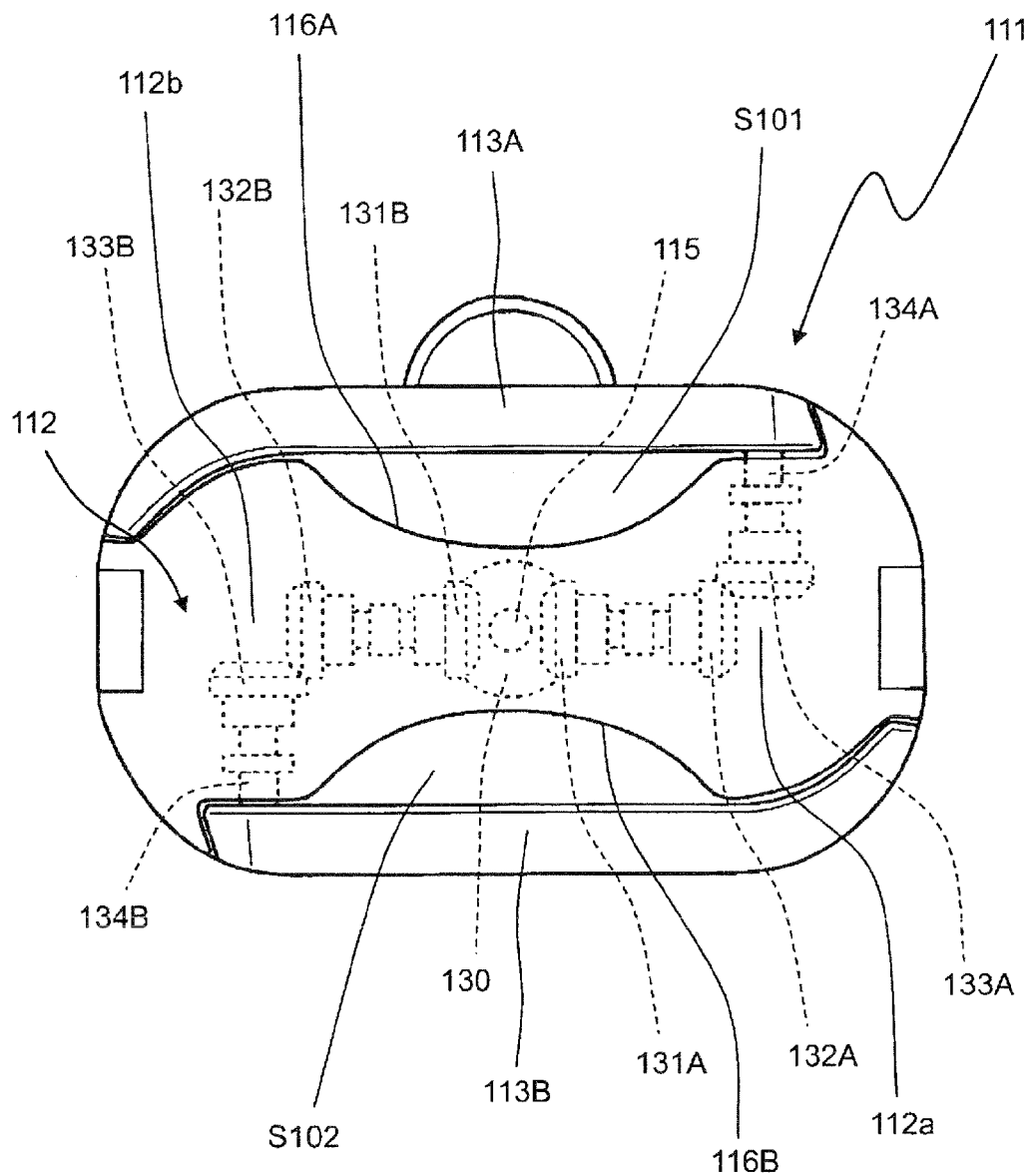
FIG. 11 shows a schematic view of a stirring unit as viewed from an inner pot side.

FIG. 11 is a schematic view of the stirring unit 111 as viewed from the inner pot 110 side.

As shown in FIG. 11, placed in the rotator 112 are a bevel gear 130 for both of the first and second stirrer arms, gears 131A, 132A, 133A for the first stirrer arm, and gears 131B, 132B, 133B for the second stirrer arm. Rotational drive force of a shaft part 115 is transmitted to a pivot shaft 134A for the first stirrer arm via the bevel gear 130 for both of the first and second stirrer arms and the gears 131A, 132A, 133A for the first stirrer arm, and moreover transmitted to a pivot shaft 134B for the second stirrer arm via the bevel gear 130 for both of the first and second stirrer arms and the gears 131B, 132B, 133B for the second stirrer arm.

Figure 12:
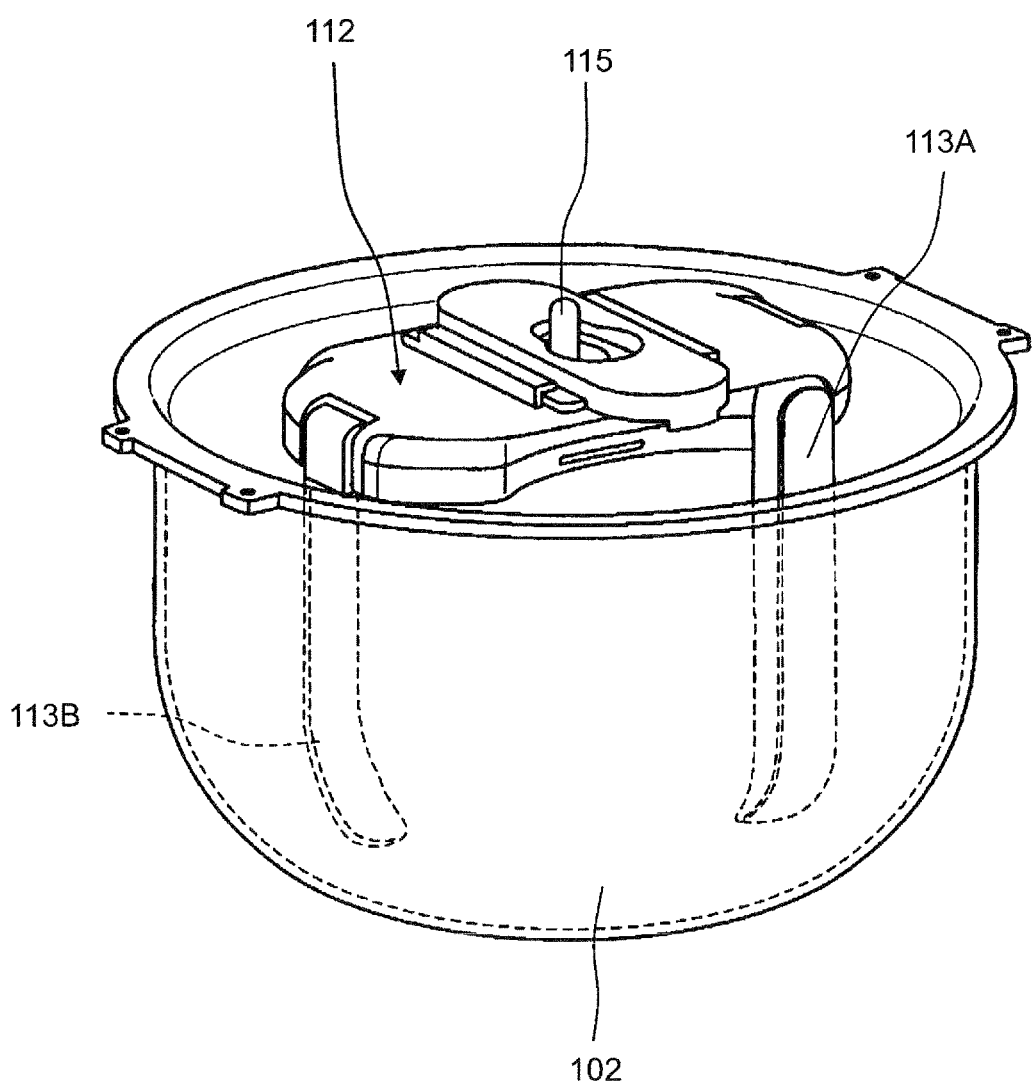
FIG. 12 shows a perspective view of the stirring unit and the inner pot of the multi-menu rice cooker.

As the shaft part 115 is rotated by the drive motor 124 (shown in FIG. 10) attached on the upper side of the inner lid 122, the first and second stirrer arms 113A, 113E are pivoted about the pivot shafts 134A, 134B for the first and second stirrer arms, respectively, thus making it possible to switch the state of the first and second stirrer arms 113A, 113B from a folded state, which is a non-stirring state shown in FIGS. 10 and 11, to an unfolded state, which is a stirring state shown in FIG. 12, and vice versa.

As shown in FIG. 11, the rotator 112 of the flattened-gourd shape has a first curved surface 116A of a circular-arc shape in plan view on the first stirrer arm 113A side, and a second curved surface 116E of a circular-arc shape in plan view on the second stirrer arm 113B side. As a result of this, the first and second stirrer arms 113A, 113B, while in the non-stirring state, are radially adjacent to the rotator 112, with spaces S101, S102 provided between the rotator 112 and the first and second stirrer arms 113A, 113B.

One end of the first stirrer arm 113A is attached to one larger-width portion of the rotator 112 via the pivot shaft 134A for the first stirrer arm. Also, one end of the second stirrer arm 113B is attached to the other larger-width portion 112b of the rotator 112 via the pivot shaft 134B for the second stirrer arm.

The bevel gear 130 for both of the first and second stirrer arms, the gears 131A, 132A, 133A for the first stirrer arm, the gears 131B, 132B, 133B for the second stirrer arm, and the pivot shafts 134A, 134B for the first and second stirrer arms constitute the drive mechanism.

By the drive mechanism that has received rotation driving force from the drive motor 124, the first and second stirrer arms 113A, 113B are pivoted so as to transit from the folded state shown in FIG. 10 to the unfolded state shown in FIG. 12 or from the unfolded state shown in FIG. 12 to the folded state shown in FIG. 10.

According to the rice cooker constituted as described above, in the folded state of FIG. 10, the stirring unit 111 is rotated forward (rotated clockwise as viewed from above) by the drive motor 124 so that the first and second stirrer arms 113A, 113B are pivoted by the drive mechanism of the rotator 112 so as to be placed in the unfolded state as shown in FIG. 12. Then, with one-way rotation by the drive motor 124, the first and second stirrer arms 113A, 113B in the unfolded state are rotated integrally with the rotator 112. As a result, rice and water, for example, in the inner pot 110 are stirred by the rotating first and second stirrer arms 113A, 113B in the unfolded state.

On the other hand, when the first and second stirrer arms 113A, 113B are in the unfolded state of FIG. 12, reverse rotation (counterclockwise rotation as viewed from above) of the stirring unit by the drive motor 124 causes the first and second stirrer arms 113A, 113B to be pivoted by the drive mechanism of the rotator 112 so as to be placed in the folded state shown in FIG. 10. As a result, the first and second stirrer arms 113A, 113B are kept from obstructing opening/closing of the lid 102.

In this way, pivoting (unfolding, folding) of the first and second stirrer arms 113A, 113B as well as rotating of the stirring unit ill can be fulfilled by the drive motor 124.

Figure 13:
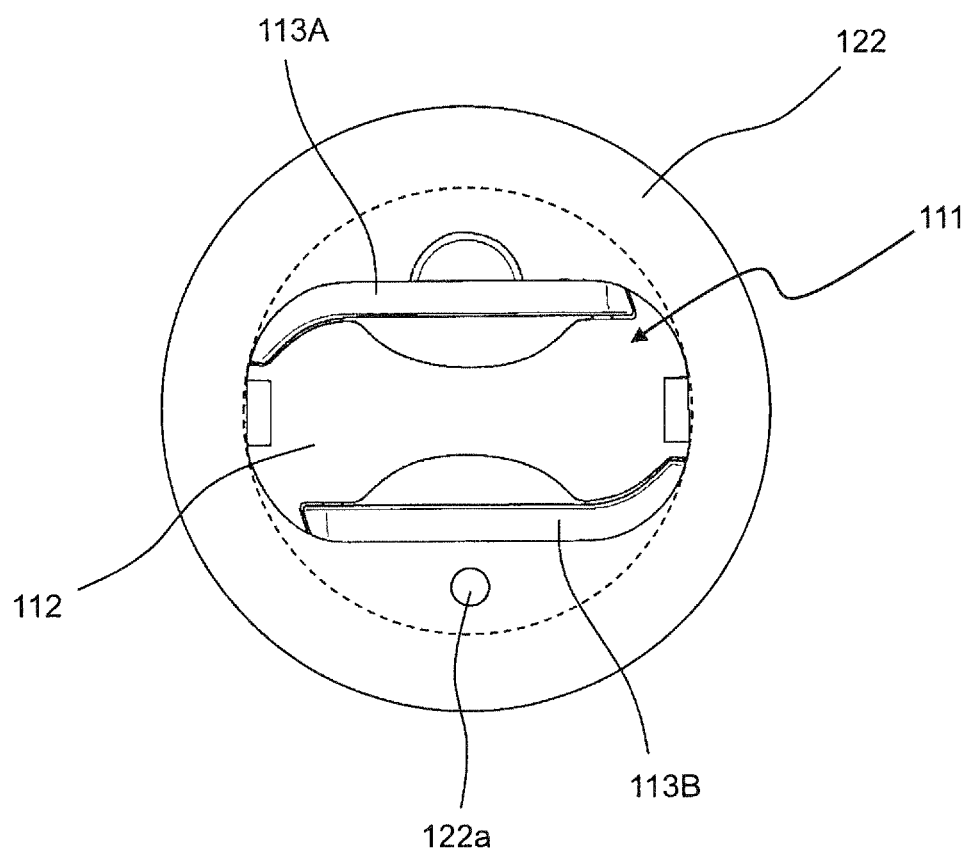
FIG. 13 shows the inner pot attached with the stirring unit as viewed from below.

FIG. 13 is a view of the inner lid 122 with the stirring unit 111 attached thereto, as viewed from below.

As shown in FIG. 13, the lid 102 has a steam discharge port 122a for discharging steam from the inner pot 110 to outside. The steam discharge port 122a is provided on an inner pot 110 side of the lid 102 and in a region inner than rotational loci (shown by dotted line in FIG. 13) of outermost peripheral portions of the rotator 112 and the first and second stirrer arms 113A, 113B in the non-stirring state (i.e., folded state). This steam discharge port 122a is connected to the steam outlet 102a of the lid 102 shown in FIG. 9.

Figure 14:
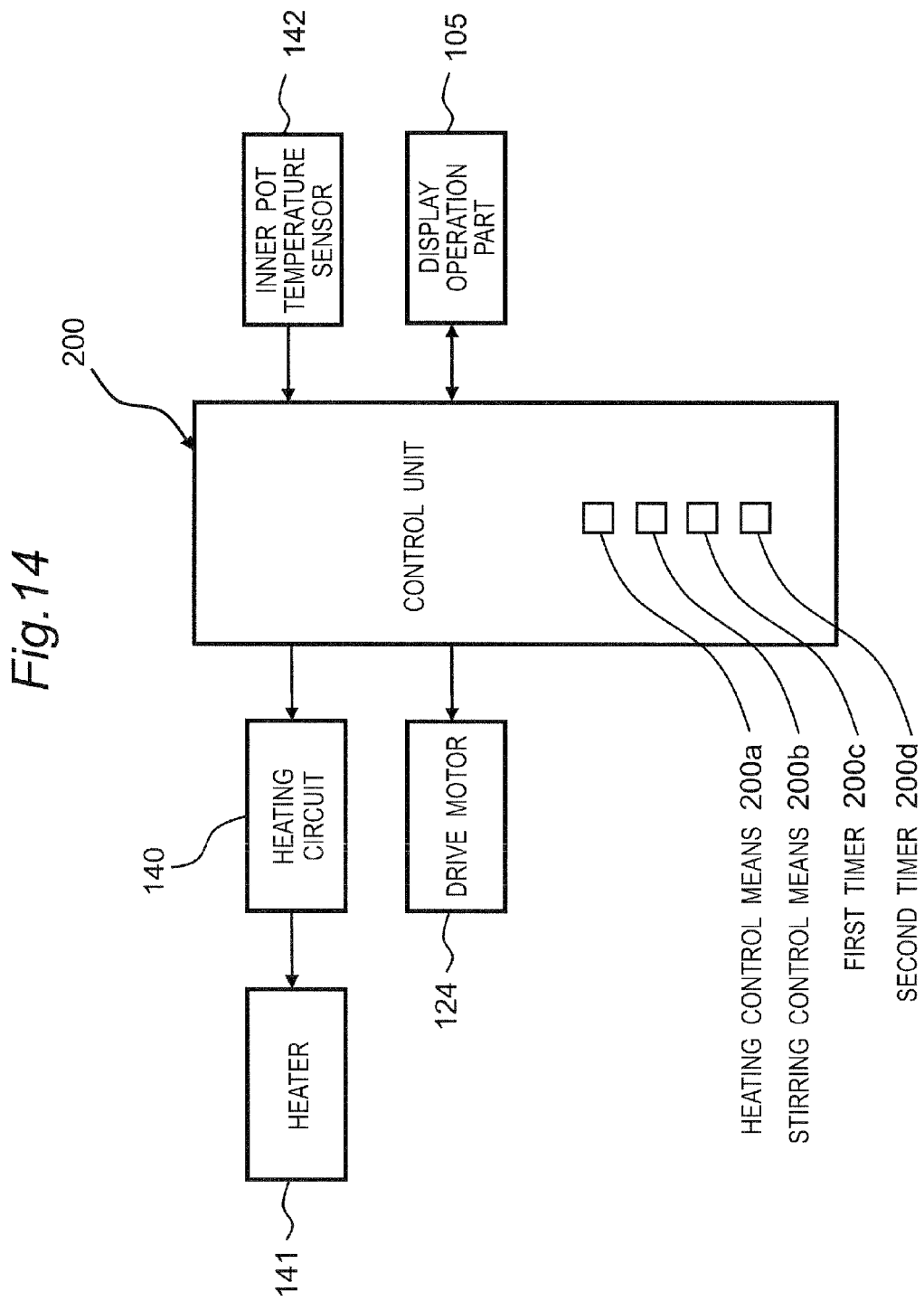
FIG. 14 shows a control block diagram of the multi-menu rice cooker.

FIG. 14 is a control block diagram of the above-described rice cooker. This rice cooker, as shown in FIG. 14, includes a control unit 200 composed of a microcomputer, input/output circuits and the like. The control unit 200 receives input of a signal from an inner pot temperature sensor 142. The control unit 200 is also connected with the drive motor 124, the display operation part 105, and a heating circuit 140 for driving a heater 141 as an example of the heating part.

The control unit 200 has a heating control means 200a for controlling the heater 141 based on a temperature of the inner pot 110 detected by the inner pot temperature sensor 142, a stirring control means 200b as an example of the stirring controller for controlling the drive motor 124, a first timer 200c, and a second timer 200d.

Figure 15:
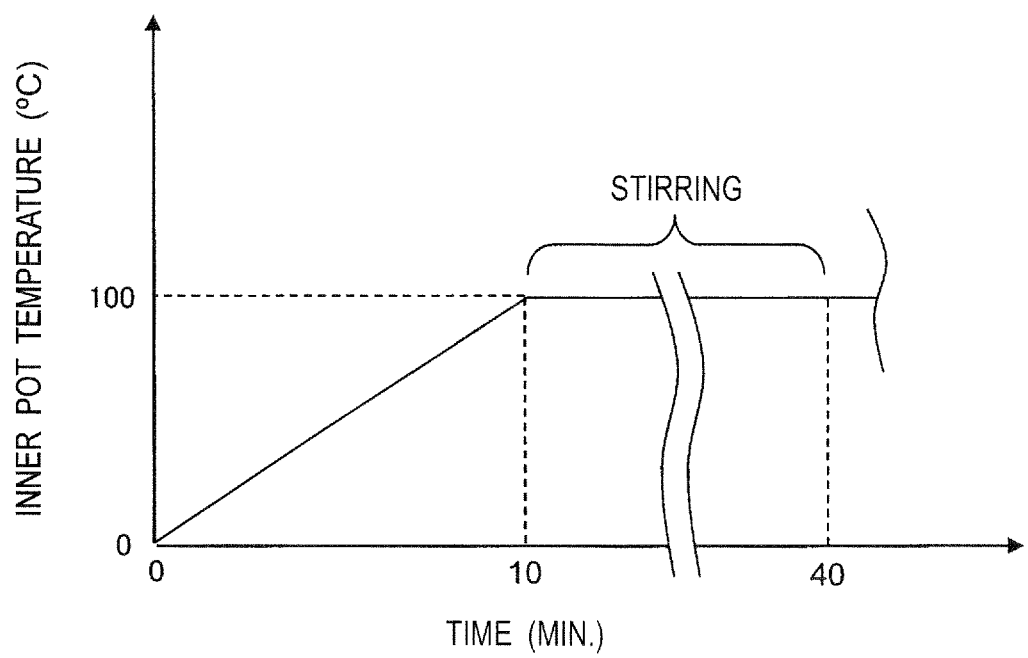
FIG. 15 shows a timing chart for the multi-menu rice cooker.

When cooking jam, for example, with the rice cooker constituted as described above, sugar, 2 cm-square pieces of apple and a squeeze of lemon are put into the inner pot 110, and the heater 141 is controlled by the heating control means 200a in such a fashion that, as shown in FIG. 15, the inner pot 110 is heated gradually with a medium thermal power so that the temperature of the inner pot 110 detected by the inner pot temperature sensor 142 becomes 100° C. ten minutes later, for example.

Next, with the temperature of the inner pot 110 held at 100° C., in a first process, the heater 141 is controlled by the heating control means 200a to heat the inner pot 110 with a high thermal power (e.g., 800 W), which is a first thermal power. At the same time, the drive motor 124 is controlled by the stirring control means 200b to rotate the rotator 112 at a high speed (e.g., at 500 rpm for 4 min.), which is a first rotation speed, with the first and second stirrer arms 113A, 113B in the non-stirring state.

Next, in a second process, the heater 141 is controlled by the heating control means 200a to heat the inner pot 110 with a low thermal power (e.g., 400 W), which is a second thermal power lower than the high thermal power. At the same time, the drive motor 124 is controlled by the stirring control means 200b to rotate the rotator 112 at a low speed (e.g., at 150 rpm for 1 min.), which is a second rotation speed (stirring speed) lower than the first rotation speed (stirring speed), with the first and second stirrer arms 113A, 113B in the non-stirring state.

Then, the first process and the second process are executed alternately for a specified time period (e.g., 30 min.) by the heating control means 200a and the stirring control means 200b (stirring-operation timing control).

Operation of the control unit 200 for cooking of apple jam will be described below with reference to flowcharts of FIGS. 16 to 18.

First, sugar, 2 cm-square pieces of apple and a squeeze of lemon each in a specified quantity are put into the inner pot 110, and the lid 102 is closed.

Next, the user operates a plurality of operation buttons 104 to select a cooking menu for cooking of apple jam.

Next, the user presses the start button (not shown) to start the cooking. Then, at step S1, the heater 141 is turned on so that the inner pot 110 is heated with a medium thermal power, which is a third thermal power (which is lower than the first thermal power and higher than the second thermal power). In this case, a preprocessing process is executed by setting input electric power for the heater 141 such that the temperature of the inner pot 110 becomes 100° C. in a specified time duration (e.g., 10 min.).

Next, if it is decided at step S2 that the temperature H of the inner pot 110 detected by the inner pot temperature sensor 142 has become 100° C., the flow goes to step S3.

Next, at step S3, the first timer 200c is started.

Figure 17:
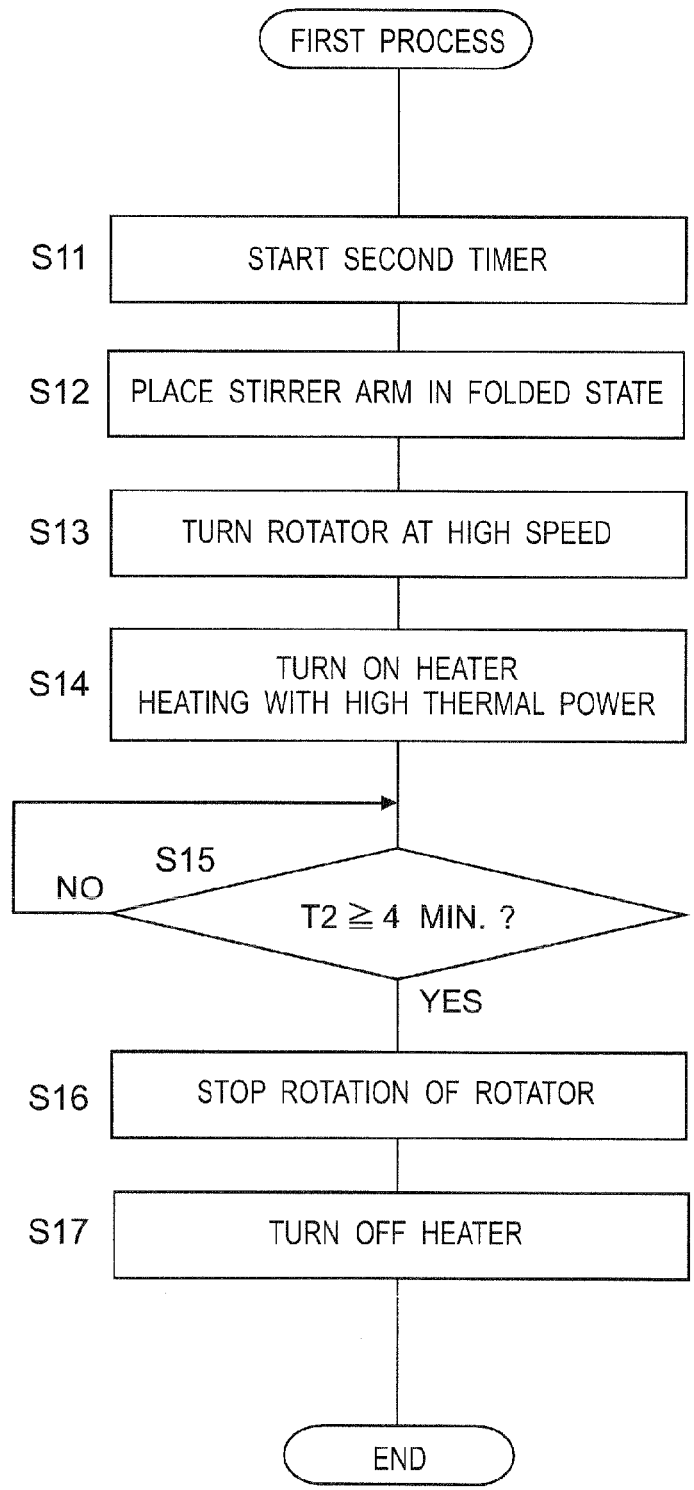
FIG. 17 shows a flowchart illustrating the processing in the first process shown in the flowchart of FIG. 16.

Next, at step S4, the first process shown in FIG. 17 is executed. Thereafter, the flow proceeds to step S5, at which the second process shown in FIG. 18 is executed.

Next, at step S6, if it is decided that a counted time T1 of the first timer 200c has exceeded a specified time Tmax (e.g., 30 min.), then the processing is ended.

Meanwhile, if it is decided at step S6 that the counted time T1 of the first timer 200c has not exceeded the time Tmax, then the flow returns to step S4, followed by repeating processes of the steps S4 and S5, alternately.

Figure 16:
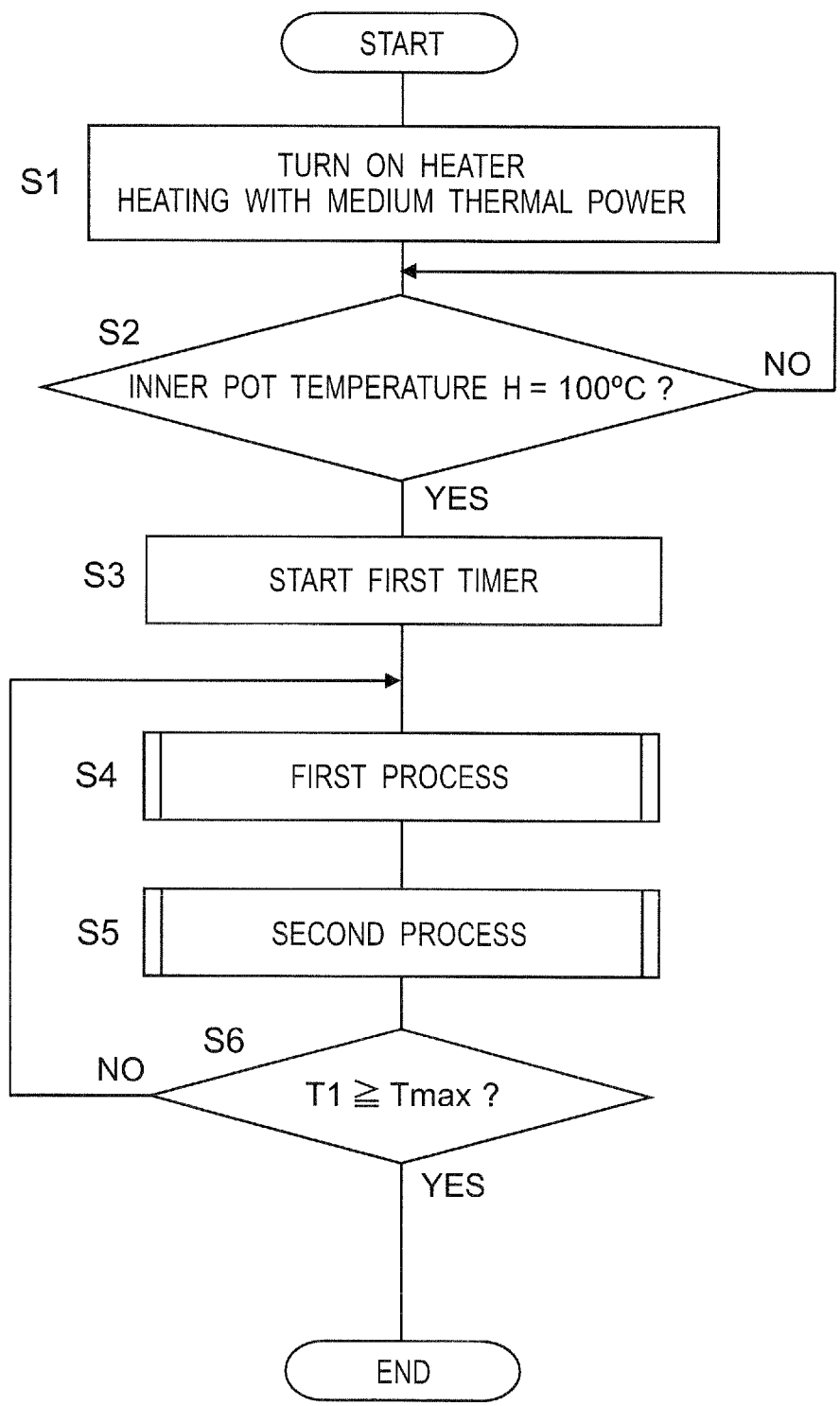
FIG. 16 shows a flowchart illustrating the operations of a control unit for cooking apple jam.

Referring now to FIG. 17 which illustrates the first process of FIG. 16, the second timer 200d is started at step S11.

Next, the flow proceeds to step S12, at which the drive motor 124 is controlled by the stirring control means 200b to make the first and second stirrer arms 113A, 113B pivot such that these stirrer arms are placed in the folded state.

Next, the flow proceeds to step S13, at which the drive motor 124 is controlled by the stirring control means 200b so that the rotator 112 is rotated at a high speed (the first rotation speed).

Next, the flow proceeds to step S14, at which the heater 141 is turned on by the heating control means 200a so that the inner pot 110 is heated with a high thermal power (the first thermal power). In this case, input electric power for the heater 141 is restricted so as to keep the temperature of the inner pot 110 from going beyond a specified upper-limit temperature.

Next, at step S15, if it is decided that a counted time T2 of the second timer 200d is 4 min. or more, then the flow goes to step S16. If it is decided that the counted time T2 of the second timer 200d is less than 4 min., then the step S15 is repeated.

Next, at step S16, the drive motor 124 is controlled by the stirring control means 200b so that the rotation of the rotator 112 is stopped.

Next, the flow proceeds to step S17, at which the heater 141 is turned off by the heating control means 200a, and the processing of the first process is ended.

Figure 18:
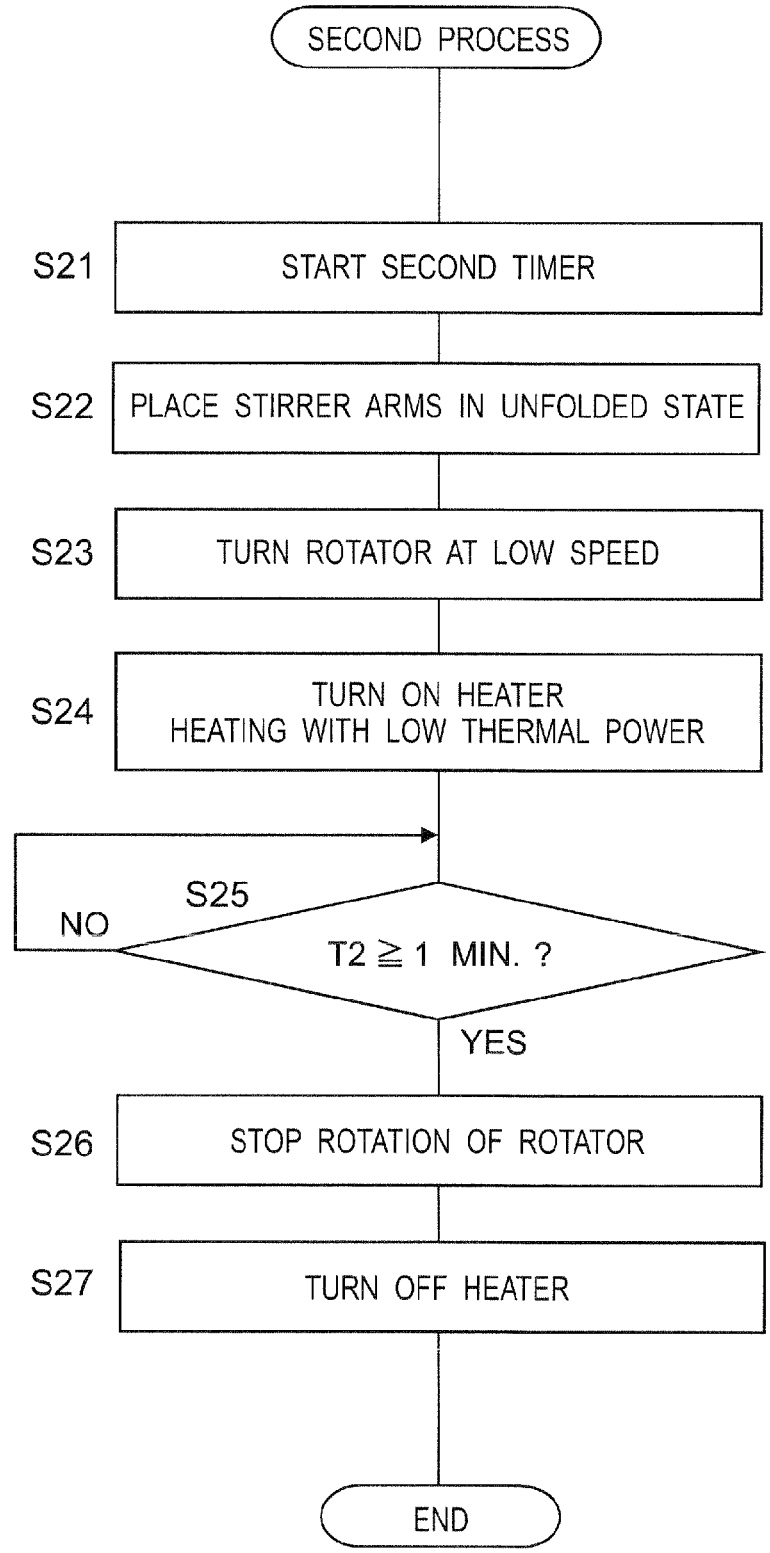
FIG. 18 shows a flowchart illustrating the processing in the second process shown in the flowchart of FIG. 16.

Next, referring to FIG. 18 that illustrates the second process of FIG. 16, the second timer 200d is started at step S21.

Next, the flow proceeds to step S22, at which the drive motor 124 is controlled by the stirring control means 200b to make the first and second stirrer arms 113A, 113B pivot such that these stirrer arms are placed in the unfolded state.

Next, at step S23, the drive motor 124 is controlled by the stirring control means 200b to rotate the rotator 112 at a low speed (the second rotation speed). As a result of this, the ingredients in the inner pot 110 are stirred slowly.

Next, the flow proceeds to step S24, at which the heater 141 is turned on by the heating control means 200a so that the inner pot 110 is heated with a low thermal power (the second thermal power). In this case, input electric power for the heater 141 is set so as not to allow air bubbles from the ingredients in the inner pot 110 to reach the inner lid 122.

Next, at step S25, if it is decided that the counted time T2 of the second timer 200d has become 1 min. or more, then the flow goes to step S26. On the other hand, if it is decided that the counted time T2 of the second timer 200d is less than 1 min., then step S25 is repeated.

Next, at step S26, the drive motor 124 is controlled by the stirring control means 200b so that the rotation of the rotator 112 is stopped.

Next, at step S27, the heater 141 is turned off by the heating control means 200a, and the processing of this second process is ended.

With this rice cooker, in addition to apple jam, it is possible to fulfill cooking of other foods that involve increased viscosity of ingredients. In such cases, what is needed is that heating conditions for the preprocessing process, the first process, and the second process be set according to the contents of the cooking.

According to the rice cooker constituted as described above, when an object to be heated is heated to be cooked while being stirred by the stirring mechanism (stirring unit 111, coupling part 120, drive motor 124), a state of the object is determined from the cooking menu to be executed and/or the heating time, and then the stirring speed, the stirring-operation timing and/or the stirring direction of the stirring mechanism is controlled by the stirring control means 200b according to the determined state of the object. By this control, it is possible to fulfill a proper stirring suited to the state, such as a state of viscosity, of food whose viscosity increases due to heating, such as jam, boiled beans, Tsukudani (soy-boiled food) of mushrooms.

Also, according to the rice cooker, even if air bubbles reaching the lid 102 are generated, during the heating with a high thermal power (first thermal power), from food whose ingredients are increased in viscosity by heating, such as a jam (e.g., sugar, 2 cm-square pieces of apple and a squeeze of lemon), boiled beans, and Tsukudani (soy-boiled food) of mushrooms, it is possible to prevent the rice cooker from boiling over because the air bubbles are moved or scattered radially outwardly by the rotator 12 and the first and second stirrer arms 113A, 113B (in the non-stirring state) rotating at a high speed (the first rotation speed), so that the air bubbles are prevented from reaching the lid 102 in the inner pot. Further, in the second process, since the inner pot 110 is heated with a low thermal power (the second thermal power), such air bubbles as reach the lid 102 are prevented from being generated so that stirring the ingredients by the first and second stirrer arms 113A, 113B (in the stirring state) allows the ingredients in the inner pot 110 to be uniformly mixed together, resulting in an achievement of good-finish cooking.

Accordingly, a cooking of food of high viscosity such as jam can be achieved with good finish and without causing a boilover of the ingredients.

Also, due to provision of the steam discharge port for discharging steam from the inner pot 110 to outside on the inner pot 110 side of the lid 102 and in a region inner than the rotational loci of the outermost peripheral portions of the rotator 112 and the first and second stirrer arms 113A, 113B in the non-stirring state, it becomes possible to move or scatter air bubbles radially outwardly by the rotator 12 and the first and second stirrer arms 113A, 113B (in the non-stirring state) rotating with a high speed (first rotation speed), whereby the air bubbles can be prevented from reaching the steam discharge port 122*a* of the lid 102. Thus, boiling over through the steam discharge port 122*a* can securely be prevented.

Further, the rice cooker is enabled to fulfill a cooking of food (e.g., jam, boiled beans, Tsukudani (soy-boiled food) of mushrooms, etc.) with use of ingredients, as the object to be heated, of which viscosity increases from heating of the inner pot 110 by the heater 141 so that air bubbles generated tend to reach the lid 102 due to the increased viscosity.

Further, the heater 141 is controlled by the heating control means 200*a* to heat the inner pot 110 containing an object to be heated, before the first process, with a medium thermal power (the third thermal power) such that the inner pot 110 with the object become a predetermined temperature. As a result of this, moisture contents come out from solid ingredients before the first process, by which it becomes possible to prevent scorching due to the heating with the high thermal power (the first thermal power) in the first process.

In the above second embodiment, the inner pot 110 is heated by resistance heating using the heater 141 as the heating part. However, without being limited to this, the heating part may also be implemented by induction heating using an induction coil as an example, and furthermore the inner pot may be heated by both resistance heating and induction heating.

The second embodiment has been described on the rice cooker as an example of the heating cooker. However, without being limited to this, the invention may also be applied to heating cookers having other constitutions.

Although specific embodiments of the present invention have been described hereinabove, yet the invention is not limited to the above first and second embodiments and may be carried out as they are changed and modified in various ways within the scope of the invention.

A multi-menu rice cooker according to an aspect of the present invention includes:

an inner pot for containing an object to be heated;

a stirring mechanism for stirring the object inside the inner pot by a rotation operation; and a stirring controller for controlling the rotation operation of the stirring mechanism, wherein during cooking in which block-like pieces of one or more cooking ingredients selected from meats, fishes and vegetables as well as a liquid soup, which are the object to be heated, are rotated by the stirring mechanism, the stirring controller controls the stirring mechanism in such a fashion that a continuous rotation period in which the stirring mechanism is rotated continuously and a rotation stop period in which the rotation of the stirring mechanism is stopped to turn back inward of the inner pot a cooking ingredient that has been displaced outward within the inner pot by a centrifugal force, are alternately repeated.

The block like pieces of a cooking ingredient, which will be also referred to as a block-like cooking ingredient hereinbelow, include pieces of proper sizes for ease of eating into which the cooking ingredient such as a kind of meat, a kind of fish, a kind of vegetable is cut and chips of burdock, onion, etc.

With the above arrangement, during cooking operation in which a mixture of the block-like cooking ingredient(s) selected from among ingredients including meats, fishes, and vegetables, and a liquid soup, which are the object to be heated, is rotated by the stirring mechanism, the stirring controller controls the stirring mechanism in such a fashion that the continuous rotation period in which the stirring mechanism is rotated continuously and the rotation stop period in which the rotation of the stirring mechanism is stopped to turn back inward of the inner pot a cooking ingredient that has been displaced outward within the inner pot by a centrifugal force, are alternately repeated. In this way, the stirring mechanism is intermittently rotated with its rotating time kept under a certain time period. As a result of this, indeed the block-like pieces of the cooking ingredients are moved by rotational force given by the stirring mechanism during the rotation of the stirring mechanism, but outer peripheral portions of the liquid surface in the inner pot are kept from being excessively elevated by the centrifugal force due to the rotation of the stirring mechanism. Also, the outer peripheral portions of the water surface in the inner pot are moved up and down by repetitions of the alternate continuous rotation periods and rotation stop periods of the stirring mechanism, by which the block-like pieces of the cooking ingredients that tend to adhere to the inner side surface of the inner pot can be loosened therefrom. Thus, the mixture of block-like pieces of the cooking ingredients and the liquid soup can be stirred and mixed uniformly without adhesion of the cooking ingredients to the inner side surface of the inner pot, so that heating nonuniformities and scorching of the inner side surface of the inner pot can be suppressed.

In one embodiment, the stirring controller controls the stirring mechanism such that the rotation stop period becomes shorter and shorter as the block-like pieces of the one or more cooking ingredients are softened more and more during the cooking.

According to the embodiment, as the block-like pieces of the cooking ingredients are increasingly softened during a cooking operation, the rotation stop period is shortened more and more. Therefore, as the heating time elapses, the mixture of the block-like pieces of the cooking ingredient and the liquid soup is liquefied so as to be less stuck or adhered to the inner side surface of the inner pot. Thus, the continuous rotation period of the stirring mechanism can be made longer relative to the rotation stop period, making it possible to achieve a more uniform mixing.

In one embodiment, during the continuous rotation period, the stirring controller makes the rotating stirring mechanism inverted in its rotational direction between forward and reverse directions.

According to the embodiment, the rotating stirring mechanism inverts its rotational direction in the first process under control of the stirring controller. Thus, the mixture of the block-like pieces of the cooking ingredient(s) and the liquid soup can be given reactionary force, resulting in achievement of more uniform mixing.

In one embodiment, the stirring controller reduces a number of rotations per unit time of the stirring mechanism as the cooking progresses.

According to the embodiment, the number of rotations per unit time of the stirring mechanism is reduced under control of the stirring controller as the cooking progresses. Therefore, the mixture of block-like cooking ingredients and liquid soup is liquefied and moreover the ingredients are softened along with the elapse of the heating time, so that the ingredients can be mixed uniformly without being damaged by the stirring.

A heating cooker according to an aspect of the present invention includes:

a container for containing an object to be heated;

a heating cooker body for housing the container therein;

a heating part placed in the heating cooker body to heat the container;

a lid openably and closably attached to an upper part of the heating cooker body, the lid being able to be closed to cover the container;

a rotator attached on a container side of the lid;

a stirrer attached to the rotator and being switchable between a stirring state of being in contact with the object to be heated within the container and a non-stirring state of being apart from the object to be heated within the container;

a driving part for rotating the rotator; and a stirring controller means that controls the driving part in such a fashion that a first process in which the rotator is rotated at a first rotation speed with the stirrer being in the non-stirring state and a second process in which the rotator is rotated at a second rotation speed lower than the first rotation speed with the stirrer being in the stirring state, are alternately repeated.

With the above arrangement, the rotator is rotated by the driving part under control of the stirring controller means at the first rotation speed with the stirrer being in the non-stirring state in the first process, and at the second rotation speed lower than the first rotation speed with the stirrer being in the stirring state in the second process. The stirring controller means controls the driving part such that the first process and the second process are repeated alternately. With such a control, during cooking of food such as a jam, boiled beans, and Tsukudani (soy-boiled food) of mushrooms whose ingredients are increased in viscosity by heating, even if such air bubbles as reach the lid are generated from the ingredients of the food, it is possible to prevent the heating cooker from boiling over in the first process because the air bubbles are moved or scattered radially outwardly by the rotator and the stirrer (in the non-stirring state) rotating at the first rotation speed, so that the air bubbles are prevented from reaching the lid in the container. Further, in the second process, by heating the container with a low thermal power, generation of air bubbles reaching the lid is prevented. Therefore, stirring the ingredients by the stirrer in the stirring state allows the ingredients in the container to be uniformly mixed, resulting in an achievement of good-finish cooking of food having a high viscosity such as a jam, without boiling over.

In one embodiment, the heating cooker further includes a heating controller means for controlling the heating part to heat the container with a first thermal power in the first process and with a second thermal power lower than the first thermal power in the second process.

In the embodiment, in the first process, the heating controller means controls the heating part to heat the container with the first thermal power and the stirring controller means controls the driving part to rotate the rotator at the first rotation speed with the stirrer being in the non-stirring state. In the second process, the heating controller means controls the heating part to heat the container with the second thermal power lower than the first thermal power and the stirring controller means controls the driving part to rotate the rotator at the second rotation speed lower than the first rotation speed with the stirrer being in the stirring state. By repeating the first and second processes alternately, during cooking of food such as a jam, boiled beans, and Tsukudani (soy-boiled food) of mushrooms whose ingredients are increased in viscosity by heating, even if such air bubbles as reach the lid are generated from the ingredients of the food, it is possible to prevent the heating cooker from boiling over in the first process because the air bubbles are moved or scattered radially outwardly by the rotator and the stirrer (in the non-stirring state) rotating at the first rotation speed, so that the air bubbles are prevented from reaching the lid in the container. Further, in the second process, while heating the container with the second thermal power lower than the first thermal power so as to prevent generation of air bubbles reaching the lid, the ingredients are stirred by the stirrer in the stirring state, which allows the ingredients in the container to be uniformly mixed, resulting in an achievement of good-finish cooking of food.

In one embodiment, the lid is provided with a steam discharge port for discharging steam from the container to outside, which port is placed on an container side of the lid and in a region inner than rotational loci of outermost peripheral portions of the rotator and the stirrer in the non-stirring state.

According to the embodiment, due to provision of the steam discharge port for discharging steam from the container to outside on the container side of the lid and in the region inner than the rotational loci of the outermost peripheral portions of the rotator and the stirrer in the non-stirring state, it becomes possible to move or scatter air bubbles radially outwardly by rotating the rotator and the stirrer (in the non-stirring state) at, for example, a high rotation speed (the first rotation speed), whereby the air bubbles can be prevented from reaching the steam discharge port of the lid. Thus, boiling over through the steam discharge port can securely be prevented.

In one embodiment, the object to be heated includes an ingredient whose viscosity is increased by heating of the container by the heating part so that air bubbles generated from the ingredient tends to reach the lid due to the increased viscosity.

According to the embodiment, it is possible to cook food using an ingredient whose viscosity is increased by heating of the container by the heating part so that air bubbles generated from the ingredient tends to reach the lid due to the increased viscosity, such as a jam, boiled beans, Tsukudani of mushrooms (mushrooms boiled down in soy source), and so on.

In one embodiment, the heating controller means controls the heating part to heat the container before the first process with a third thermal power lower than the first thermal power and higher than the second thermal power such that the container containing the object to be heated becomes a predetermined temperature before the first process.

According to the embodiment, under control of the heating controller means, before the first process, the heating part heats the container with the third thermal power (which is lower than the first thermal power and higher than the second thermal power), so that the container containing the object to be heated becomes a predetermined temperature before the first process. As a result of this, moisture contents come out from solid ingredients before the first process, by which it becomes possible to prevent scorching due to the heating with the first thermal power in the first process.

REFERENCE SIGNS LIST 1 rice cooker body
2 lid
3 LCD part
4 plurality of operation buttons
5 display operation part
6 hook button
7 power cord
8 engaged portion
9 lock mechanism
10 inner pot
11 stirring unit 12 rotator
13A, 13B first and second stirrer arms
15 shaft part
20 coupling part
21 outer lid
22 inner lid
23 packing
24 drive motor
25 engaging portion
40 heating circuit
41 heater
42 inner pot temperature sensor
100 control unit
100a heating control means
100b stirring control means
100c cooking menu selecting means
100d cooking menu storage means
101 rice cooker body
102 lid
103 LCD part
104 plurality of operation buttons
105 display operation part
106 hook button
107 power cord
108 engaged portion
109 lock mechanism
110 inner pot
111 stirring unit
112 rotator
113A, 113B first and second stirrer arms
115 shaft part
121 outer lid
122 inner lid
123 packing
124 drive motor
125 engaging portion
140 heating circuit
141 heater
142 inner pot temperature sensor
200 control unit
200a heating control means
200b stirring control means

The invention claimed is:

1. A multi-menu rice cooker comprising:
an inner pot for containing objects to be heated;
a stirring mechanism for stirring the objects inside the inner pot by a rotation operation; and
a stirring controller for controlling a continuous rotation period in which the stirring mechanism is rotated continuously and a rotation stop period in which the rotation of the stirring mechanism is stopped to turn back inward of the inner pot a cooking ingredient that has been displaced outward within the inner pot by a centrifugal force; and
a cooking menu storage that stores a ratio of the rotation stop period to the continuous rotation period for each of a plurality of predetermined cooking menus, wherein
during cooking in which block-like pieces of one or more cooking ingredients selected from meats, fishes and vegetables as well as a liquid soup, which are the objects to be heated, are rotated by the stirring mechanism, the stirring controller controls the ratio based on a selected predetermined menu among the plurality of predetermined menus, and the rotation stop period and the continuous rotation period are alternately repeated.

* * * * *